(12) United States Patent
Matsuura et al.

(10) Patent No.: US 7,383,027 B2
(45) Date of Patent: Jun. 3, 2008

(54) TRANSMISSION CIRCUIT

(75) Inventors: Toru Matsuura, Sakai (JP); Hisashi Adachi, Mino (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 589 days.

(21) Appl. No.: 11/041,360

(22) Filed: Jan. 25, 2005

(65) Prior Publication Data
US 2005/0164660 A1  Jul. 28, 2005

(30) Foreign Application Priority Data
Jan. 26, 2004 (JP) .............................. 2004-017656

(51) Int. Cl.
*H04B 1/68* (2006.01)
(52) U.S. Cl. .................... 455/108; 455/110; 455/127.1
(58) Field of Classification Search .................... None
See application file for complete search history.

(56) References Cited
U.S. PATENT DOCUMENTS
6,636,112 B1  10/2003  McCune 7,092,683 B2 *  8/2006  Tanaka et al. ............... 455/108
2006/0009169 A1 *  1/2006  Arayashiki ................... 455/108
2006/0264186 A1 * 11/2006  Akizuki et al. .............. 455/108

OTHER PUBLICATIONS

F.H. Raab et al., "High-Efficiency L-Band Kahn-Technique Transmitter", 1998 IEEE MTT-S int. Microwave Symp. Digest.

* cited by examiner

*Primary Examiner*—Thanh Cong Le
(74) *Attorney, Agent, or Firm*—Wenderoth, Lind & Ponack, L.L.P.

(57) ABSTRACT

A transmission circuit capable of transmitting a modulated wave signal using polar modulation in a broad band and with low power consumption is provided. The transmission circuit generates an amplitude signal and a phase signal based on data to be transmitted, and separates the amplitude signal into a low-frequency amplitude signal and a high-frequency amplitude signal. The transmission circuit amplitude-modulates the phase signal in a broad band using the high-frequency amplitude signal in a high-frequency voltage control section 104 and an amplitude modulation section 105 and amplitude-modulates the phase signal into low power consumption using the low-frequency amplitude signal in a low-frequency voltage control section 106 and amplitude modulation section 107.

48 Claims, 20 Drawing Sheets

TRANSMISSION CIRCUIT

BACKGROUND OF THE INVENTION

1. Field of the Invention

The present invention relates to a transmission circuit for use in communication apparatuses, such as mobile phones, wireless LANs and the like. More particularly, the present invention relates to a transmission circuit capable of low power consumption and broad-band operation.

2. Description of the Background Art

Recently, mobile communication systems (e.g., mobile phones, wireless LANs, etc.) use broad-band modulated signals for high-speed data transmission. Therefore, communication apparatuses provided in terminals need to operate in a broad band and with low power consumption. Communication apparatuses consume much power to amplify the output power of transmitted radio wave. Therefore, such communication apparatuses require a transmission circuit which can operate in a broad band and amplify output power with low power consumption.

Conventionally, polar modulation is known as a technique for operating a transmission circuit in a communication apparatus. Polar modulation is also called EER (Envelope Elimination and Restoration), in which a signal is separated into amplitude and angle components, the components are separately amplified/modulated in respective modulation sections, and the modulated amplitude components and the modulated angle components are combined. A transmission circuit employing polar modulation is disclosed in, for example, F. H. Raab, "High-efficiency L-band Kahn-technique transmitter", 1998 IEEE MTT-S Int. Microwave Symp. Dig. Hereinafter, a conventional transmission circuit employing polar modulation will be described with reference to the accompanying drawings.

FIG. 24 is a block diagram showing an exemplary structure of the conventional transmission circuit employing polar modulation. Referring to FIG. 24, the transmission circuit comprises a data generation section 1901, an angle modulation section 1902, an amplitude modulation section 1903, a voltage control section 1904, and an output terminal 1905. The data generation section 1901 is connected via the angle modulation section 1902 to the gate or base of the amplitude modulation section 1903, and is also connected via the voltage control section 1904 to the drain or collector of the amplitude modulation section 1903. The output of the amplitude modulation section 1903 is connected to the output terminal 1905.

In the above-described transmission circuit, the data generation section 1901 generates a signal containing an amplitude data component (hereinafter referred to as an amplitude signal) and a signal containing a phase data component (hereinafter referred to as a phase signal), based on data to be transmitted. The amplitude signal is input to the voltage control section 1904. The voltage control section 1904 amplifies the input amplitude signal, and outputs the resultant signal to the amplitude modulation section 1903. In other words, the voltage control section 1904 supplies a voltage which has been controlled using the amplitude signal to the amplitude modulation section 1903.

The phase signal is input to the angle modulation section 1902. The angle modulation section 1902 angle-modulates the input phase signal and outputs the resultant angle-modulated wave signal. The amplitude modulation section 1903 amplitude-modulates the input angle-modulated wave signal based on the voltage supplied from the voltage control section 1904, and outputs the resultant modulated wave signal. Thus, the output terminal 1905 outputs the modulated wave signal.

Note that detailed structures of the amplitude modulation section 1903 and the voltage control section 1904 will be described with reference to FIGS. 25 to 27.

Firstly, a structure of the voltage control section 1904 will be described.

For example, a series regulator or a switching regulator can be applied as the voltage control section 1904.

Firstly, a voltage control section employing a series regulator will be described.

FIG. 25 is a block diagram showing an exemplary structure of the voltage control section employing a series regulator. Referring to FIG. 25, the voltage control section 1904 comprises an input terminal 2001, a power source 2002, an output terminal 2003, a comparison section 2004, and a transistor 2005.

In FIG. 25, the input terminal 2001 is connected to the data generation section 1901. The amplitude signal is input via the input terminal 2001 to the data generation section 1901. The amplitude signal received through the input terminal 2001 is input via the comparison section 2004 to the gate or base of the transistor 2005. In other words, a voltage which has been controlled based on the amplitude signal is applied to the gate or base of the transistor 2005. The drain or collector of the transistor 2005 is connected to the power source 2002, which applies a voltage thereto. Therefore, an amplified amplitude signal is output from the source or emitter of the transistor 2005. The amplitude signal amplified by the transistor 2005 is input via the output terminal 2003 to the drain or collector of the amplitude modulation section 1903. In other words, a voltage which has been controlled using the amplitude signal is applied to the drain or collector of the amplitude modulation section 1903.

In the voltage control section 1904 of FIG. 25, a signal output from the source or emitter of the transistor 2005 is fed back to the comparison section 2004 so that a stable output voltage can be obtained.

The voltage control section employing the series regulator has lower power efficiency (larger power consumption) than that of a voltage control section employing a switching regulator, but is known to be capable of operating in a broad band.

Next, the voltage control section employing a switching regulator will be described.

FIG. 26 is a block diagram showing an exemplary structure of the voltage control section employing a switching regulator. The voltage control section 1904 comprises a pulse conversion section 2101, an amplifier 2102, a lowpass filter 2103, an input terminal 2104, and an output terminal 2105.

Referring to FIG. 26, the input terminal 2104 is connected to the data generation section 1901. The amplitude signal is input via the input terminal 2104 to the data generation section 1901. The amplitude signal received through the input terminal 2104 is converted to a pulse signal by the pulse conversion section 2101. The pulse conversion section 2101 performs conversion using, for example, PWM, delta-sigma modulation or the like. The pulse signal is amplified by the amplifier 2102, and is transferred to the lowpass filter 2103. Note that the amplifier 2102 may be, for example, a class-D or -S amplifier for the purpose of highly efficient signal amplification.

A spurious signal having a clock frequency which occurs in the pulse generation is removed from the amplified pulse signal by the lowpass filter 2103 before the amplified pulse signal is output from the output terminal 2105. The signal output from the output terminal 2105 is input to the drain or collector of the amplitude modulation section 1903. In other words, a voltage whose output level has been controlled using the amplitude signal is applied to the drain or collector of the amplitude modulation section 1903. Note that the voltage control section 1904 may feed an output of the lowpass filter 2103 back to the pulse conversion section 2101.

The voltage control section employing the switching regulator does not operate in a broad band better than the voltage control section employing the series regulator, but is known to have higher power efficiency (lower power consumption).

Next, the amplitude modulation section 1903 will be described with reference to the drawings.

FIG. 27 is a block diagram showing an exemplary structure of the amplitude modulation section 1903 of FIG. 24. The amplitude modulation section 1903 comprises an input terminal 2201, an input terminal 2205, an output terminal 2202, a transistor 2203, a power source terminal 2204, a matching circuit 2206, a matching circuit 2207, a bias circuit 2208, and a bias circuit 2209.

Referring to FIG. 27, the input terminal 2201 is connected to the angle modulation section 1902. The angle-modulated wave signal is input via the input terminal 2201 to the angle modulation section 1902. The input terminal 2201 is also connected via the matching circuit 2206 to the gate or base of the transistor 2203. A DC voltage is applied to the power source terminal 2204. The input terminal 2205 is connected to the voltage control section 1904. The amplified amplitude signal is input via the input terminal 2205 to the voltage control section 1904. The input terminal 2205 is also connected via the bias circuit 2209 to the drain or collector of the transistor 2203. The output terminal 2202 is connected to the output terminal 1905.

In other words, the angle-modulated wave signal is input to the gate or base of the transistor 2203, and a voltage which has been controlled using the amplitude signal is applied to the drain or collector of the transistor 2203. The transistor 2203 amplitude-modulates the angle-modulated wave signal using the voltage which has been controlled using the amplitude signal, and outputs the resultant modulated wave signal. The modulated wave signal is output via the matching circuit 2207 to the output terminal 2202.

Note that the matching circuit 2206, the matching circuit 2207, the bias circuit 2208, and the bias circuit 2209 are provided in general amplitude modulation sections and will not be explained in detail.

A voltage control section employing a series regulator, such as that of FIG. 25, can operate in a broad band. However, the voltage control section uses the transistor 2005 as a variable resistance, and therefore, its power loss is large when an output voltage of the output terminal 2003 is small. As a result, a transmission circuit which comprises a voltage control section employing a series regulator, such as that of FIG. 25, has a large total of power consumption.

A voltage control section employing a switching regulator, such as that of FIG. 26, has high power efficiency, but does not operate in a broad band satisfactorily for the following reason. In general, a voltage control section needs to operate the pulse conversion section 2101 at a frequency 10 or more times than a signal band. However, it is difficult for the pulse conversion section 2101 to operate in such a broad band. In addition, when the voltage control section forces the pulse conversion section 2101 to operate in a broad band, power consumption is increased. As a result, a transmission circuit which comprises a voltage control section employing a switching regulator, such as that of FIG. 26, has difficulty in operating in a broad band, and when the voltage control section is forced to operate in a broad band, total power consumption is increased.

High-speed communication is keenly required for recent communication apparatuses. Therefore, transmission circuits which are applied to current communication apparatuses are composed of a voltage control section employing a series regulator, such as that of FIG. 25, which can operate in a broad band. As a result, transmission circuits capable of broad-band operation disadvantageously have high power consumption.

SUMMARY OF THE INVENTION

Therefore, an object of the present invention is to provide a transmission circuit capable of low power consumption and broad-band operation.

The present invention is directed to a transmission circuit for generating a modulated wave signal as a transmission signal. To achieve the above-described object, a transmission circuit of the present invention comprises a data generation section, a frequency discrimination section, a voltage control section, and a modulation section.

The data generation section generates an amplitude signal containing an amplitude data component and a signal containing a phase data component based on data to be transmitted. The frequency discrimination section separates the amplitude signal into a low-frequency amplitude signal and a high-frequency amplitude signal and outputs these signals to the voltage control section. The frequency discrimination section outputs the low-frequency amplitude signal using a predetermined frequency as a cut-off frequency, and divides the amplitude signal by the low-frequency amplitude signal to output the high-frequency amplitude signal. The voltage control section outputs a voltage whose output level has been controlled corresponding to at least one of the low-frequency amplitude signal and the high-frequency amplitude signal. The modulation section modulates the signal containing the phase data component using the voltage output whose output level has been controlled using the low-frequency amplitude signal or the high-frequency amplitude signal output from the voltage control section, to generate the modulated wave signal.

Preferably, the data generation section generates a phase signal as the signal containing the phase data component. In this case, the voltage control section comprises a high-frequency voltage control section and a low-frequency voltage control section. In addition, the modulation section comprises an angle modulation section, a high-frequency amplitude modulation section, and an amplitude modulation section.

The angle modulation section angle-modulates the phase signal generated by the data generation section to output an angle-modulated wave signal. The high-frequency voltage control section outputs a voltage whose output level has been controlled using the high-frequency amplitude signal separated by the frequency discrimination section. The high-frequency amplitude modulation section amplitude-modulates the angle-modulated wave signal output by the angle modulation section using the voltage output by the high-frequency voltage control section to output a modulated wave signal. The low-frequency voltage control section outputs a voltage whose output level has been controlled corresponding to the low-frequency amplitude signal separated by the frequency discrimination section. The amplitude modulation section amplitude-modulates the modulated wave signal output by the high-frequency amplitude modulation section using the voltage output by the low-frequency amplitude signal to generate the modulated wave signal to be transmitted.

The data generation section can also generate a quadrature signal obtained by representing a phase signal in an orthogonal coordinate system as the signal containing the phase data component. In this case, the voltage control section comprises a low-frequency voltage control section. Further, the modulation section comprises a multiplication section, a quadrature modulation section, and an amplitude modulation section.

The multiplication section multiplies the quadrature signal generated by data generation section by the high-frequency amplitude signal separated by the frequency discrimination section. The quadrature modulation section quadrature-modulates the signal obtained by multiplication of the multiplication section to output a quadrature-modulated signal. The low-frequency voltage control section outputs a voltage whose output level has been controlled corresponding to the low-frequency amplitude signal separated by the frequency discrimination section. The amplitude modulation section amplitude-modulates the quadrature-modulated signal using the voltage output by the low-frequency voltage control section to generate the modulated wave signal.

According to another embodiment of the present invention, the voltage control section may comprise a low-frequency voltage control section and a high-frequency voltage control section. In addition, the modulation section comprises an angle modulation section and an amplitude modulation section. In this case, the data generation section generates a phase signal as the signal containing the phase data component.

The angle modulation section angle-modulates the phase signal generated by the data generation section to output an angle-modulated wave signal. The low-frequency voltage control section outputs a voltage whose output level has been controlled corresponding to the low-frequency amplitude signal separated by the frequency discrimination section. The high-frequency voltage control section outputs a voltage whose output level has been controlled corresponding to the high-frequency amplitude signal separated by the frequency discrimination section and the voltage output by the low-frequency voltage control section. The amplitude modulation section amplitude-modulates the angle-modulated wave signal output by the angle modulation section using the voltage output from the high-frequency voltage control section to generate the modulated wave signal.

The frequency discrimination section can comprise a lowpass filter and a division section. The lowpass filter extracts a component having a frequency lower than a predetermined frequency from the amplitude signal generated by the data generation section to output the low-frequency amplitude signal. The division section divides the amplitude signal generated by the data generation section by the low-frequency amplitude signal extracted by the lowpass filter to output the high-frequency amplitude signal.

The high-frequency voltage control section is preferably a series regulator. The low-frequency voltage control section is preferably a switching regulator.

The low-frequency voltage control section can comprise a pulse conversion section, an amplifier, and a lowpass filter. The pulse conversion section converts the low-frequency amplitude signal to a pulse to output a pulse signal. The amplifier amplifies the pulse signal output by the pulse conversion section to output a voltage whose output level has been controlled corresponding to the pulse signal. The lowpass filter eliminates a noise signal.

When the output level of the signal transmitted from the amplitude modulation section is smaller than a threshold defining a predetermined signal intensity, the frequency discrimination section can reduce the predetermined cut-off frequency in a stepwise manner, corresponding to the output level of the signal. In this case, the frequency discrimination section outputs a signal (DC or near-DC signal) whose energy is concentrated into a DC component in a stepwise manner, as the low-frequency amplitude signal.

The transmission circuit may correct at least one of an output timing and a size of the low-frequency amplitude signal and the high-frequency amplitude signal separated by the frequency discrimination section (hereinafter referred to as a correction control). In this case, the modulation section further comprises a divider. In addition, the voltage control section further comprises an envelope detector, a control section, and a correction section.

The divider divides and provides the modulated wave signal output from the amplitude modulation section to the envelope detector. The envelope detector detects an envelope from the modulated wave signal provided from the divider to output a post-modulation amplitude signal. The control section compares the amplitude signal generated by the data generation section with the post-modulation amplitude signal output by the envelope detector to measure a shift between a low-frequency amplitude signal and a high-frequency amplitude signal contained in the post-modulation amplitude signal, and outputs an instruction to eliminate the shift. The correction section delays a timing of outputting at least one of the low-frequency amplitude signal and the high-frequency amplitude signal separated by the frequency discrimination section in accordance with the instruction of the control section. The correction section can also adjust a gain of at least one of the low-frequency amplitude signal and the high-frequency amplitude signal separated by the frequency discrimination section in accordance with the instruction of the control section.

Note that the transmission circuit can be provided with a divider in the voltage control section in order to perform a correction control between the low-frequency amplitude signal and the high-frequency amplitude signal separated by the frequency discrimination section. In this case, the voltage control section further comprises an envelope detector, a control section, a correction section, and a divider.

The transmission circuit can have another structure to perform a correction control between the low-frequency amplitude signal and the high-frequency amplitude signal separated by the frequency discrimination section. In this case, the modulation section comprises an angle modulation section, a high-frequency amplitude modulation section, and an amplitude modulation section. Further, the voltage control section comprises a high-frequency voltage control section, a low-frequency voltage control section, a first divider, a second divider, a control section, and a correction section.

The first divider divides and provides a voltage which has been controlled using the high-frequency amplitude signal output from the high-frequency voltage control section to the control section and the high-frequency amplitude section. The second voltage control section divides and provides a voltage which has been controlled using the low-frequency amplitude signal output from the low-frequency voltage control section to the control section and the amplitude modulation section. The control section measures a shift between a high-frequency amplitude signal and a low-frequency amplitude signal contained in the voltage voltages divided by the first divider and the second divider, respectively, using the amplitude signal generated by the data generation section as a reference. The correction section delays a timing of outputting at least one of the low-frequency amplitude signal and the high-frequency amplitude signal separated by the frequency discrimination section in accordance with the instruction of the control section. The correction section can also adjust a gain of at least one of the low-frequency amplitude signal and the high-frequency amplitude signal separated by the frequency discrimination section in accordance with the instruction of the control section.

The transmission circuit can have still another structure to perform a correction control between the low-frequency amplitude signal and the high-frequency amplitude signal separated by the frequency discrimination section. In this case, the modulation section comprises a multiplication section, a quadrature modulation section, a first divider, and an amplitude modulation section. In addition, the voltage control section comprises a low-frequency voltage control section, a second divider, a control section, an envelope detector, and a correction section.

The first divider divides and provides the quadrature-modulated signal output from the quadrature modulation section to the envelope detector and the amplitude modulation section. The envelope detector detects an envelope from the quadrature-modulated signal divided by the first divider to output a post-modulation amplitude signal. The second divider divides and provides a voltage which has been controlled using the low-frequency amplitude signal output from the low-frequency voltage control section to the control section and the amplitude modulation section. The control section measures a shift between a high-frequency amplitude signal contained in the post-modulation amplitude signal output by the envelope detector and a low-frequency amplitude signal contained in the voltage divided by the second divider using the amplitude signal generated by the data generation section and outputs an instruction to eliminate the measured shift. The correction section delays a timing of outputting at least one of the low-frequency amplitude signal and the high-frequency amplitude signal separated by the frequency discrimination section in accordance with the instruction of the control section. The correction section can also adjust a gain of at least one of the low-frequency amplitude signal and the high-frequency amplitude signal separated by the frequency discrimination section in accordance with the instruction of the control section.

Further, the transmission circuit can eliminate a shift between the amplitude signal and the signal containing the phase data component which are generated by the data generation section (hereinafter referred to as a delay control). In this case, the transmission circuit further comprises a control section and a demodulation section. In addition, the modulation section further comprises a divider.

Preferably, the data generation section generates a phase signal as the signal containing the phase data component. The divider divides and provides the modulated wave signal output from the amplitude modulation section to a demodulation section. The demodulation section demodulates the modulated wave signal divided by the divider to output a post-modulation amplitude signal and a post-modulation phase signal. The control section measures a shift between the post-modulation amplitude signal and the post-modulation phase signal output by the demodulation section and controls the data generation section so that a shift between the amplitude signal and the phase signal output from the data generation section is eliminated. Note that the data generation section can also generate a quadrature signal obtained by representing a phase signal in an orthogonal coordinate system as the signal containing the phase data component.

The transmission circuit can have another structure to perform a correction control between the low-frequency amplitude signal and the high-frequency amplitude signal separated by the frequency discrimination section. This transmission circuit separates the modulated wave signal into a post-modulation high-frequency amplitude signal and a post-modulation low-frequency amplitude signal before comparing these signals with the signals output from the frequency discrimination section. In this case, the modulation section further comprises a divider. In addition, the voltage control section further comprises a control section, a modulation frequency discrimination section, an envelope detector, and a correction section.

The divider also divides and provides the modulated wave signal output from the amplitude modulation section to an envelope detector. The envelope detector detects an envelope from the modulated wave signal divided by the divider to output a post-modulation amplitude signal. The modulation frequency discrimination section separates the post-modulation amplitude signal into a post-modulation low-frequency amplitude signal and a post-modulation high-frequency amplitude signal based on a predetermined frequency threshold. The control section measures a shift between the post-modulation high-frequency amplitude signal and the post-modulation low-frequency amplitude signal separated by the modulation frequency discrimination section using the high-frequency amplitude signal and the low-frequency amplitude signal separated by the frequency discrimination section as a reference, and outputs an instruction to eliminate the measure shift. The correction section delays a timing of outputting at least one of the low-frequency amplitude signal and the high-frequency amplitude signal separated by the frequency discrimination section in accordance with the instruction of the control section. The correction section can also adjust a gain of at least one of the low-frequency amplitude signal and the high-frequency amplitude signal separated by the frequency discrimination section in accordance with the instruction of the control section.

Furthermore, the present invention is also directed to a communication apparatus which outputs a radio signal. The communication apparatus comprises the above-described transmission circuit and an antenna section for outputting a modulated wave signal generated by the transmission circuit as a radio signal.

As described above, in the present invention, an amplitude signal and a phase signal are generated based on data to be transmitted. Next, the phase signal is angle-modulated, while the amplitude signal is separated into a high-frequency amplitude signal and a low-frequency amplitude signal, thereby making it possible to amplitude-modulate the angle-modulated phase signal using the high-frequency amplitude signal and the low-frequency amplitude signal separately. Note that a quadrature signal obtained by representing the phase signal in an orthogonal coordinate system can be used as the phase signal. In this case, the quadrature signal is quadrature-modulated. In other words, when performing amplitude modulation using the high-frequency amplitude signal, the transmission circuit gives a higher priority to broad-band operation than power efficiency. When performing amplitude modulation using the low-frequency amplitude signal, the transmission circuit gives a higher priority to power efficiency than broad band operation. Thereby, the transmission circuit can operate in a broad band and reduce total power consumption. In addition, by controlling the output timing or size of the high-frequency amplitude signal and the low-frequency amplitude signal separated by the frequency discrimination section, it is possible to hold the linearity of the output signal. Note that by controlling the timing of transmitting the amplitude signal and the signal containing the phase data component which are generated by the data generation section, it is possible to hold the linearity of the output signal.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
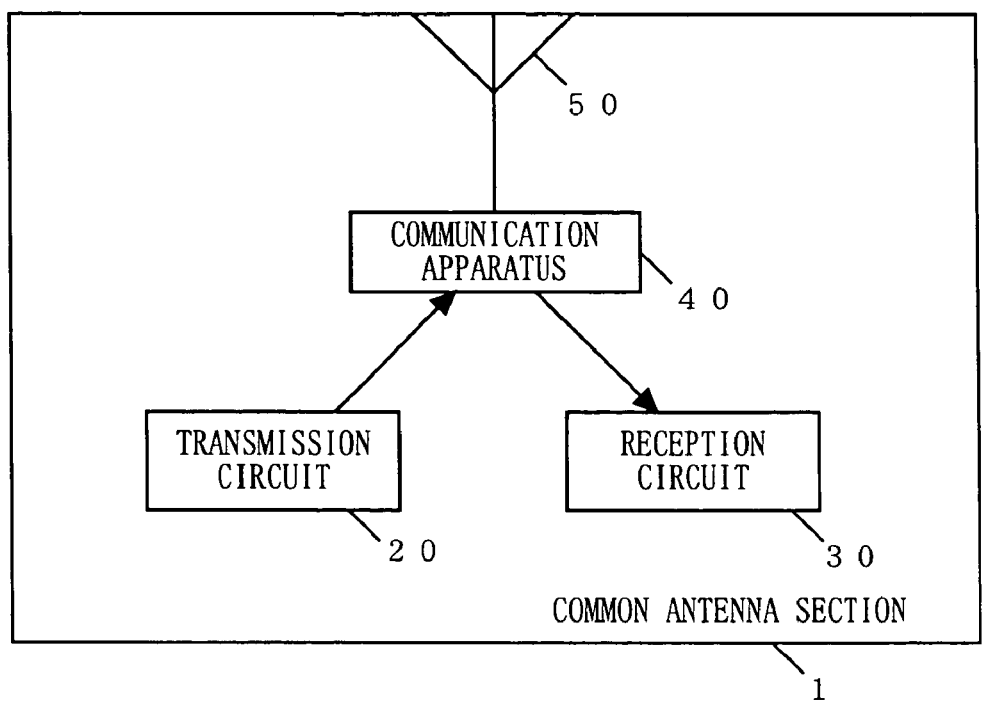
FIG. 1 is a block diagram showing an exemplary whole structure of a communication apparatus employing a transmission circuit according to the present invention.

Firstly, a whole structure of a communication apparatus employing a transmission circuit according to the present invention will be described with reference to the drawings. The communication apparatus has the same structure as that of general communication apparatuses, such as mobile phone terminals, wireless LAN terminals and the like, except for the characteristic transmission circuit. FIG. 1 is a block diagram showing an exemplary whole structure of the communication apparatus employing the transmission circuit of the present invention.

Referring to FIG. 1, the communication apparatus 1 can perform wireless communication via an antenna section 50. The communication apparatus 1 comprises a transmission circuit 20, a reception circuit 30, a common antenna section 40, and the antenna section 50.

The transmission circuit 20 generates a modulated wave signal as a transmission signal. The common antenna section 40 is connected to the transmission circuit 20 and the reception circuit 30, and sorts a transmission signal and a reception signal. The antenna section 50 transmits/receives a signal by wireless communication. The reception circuit 30 receives a reception signal from the common antenna section 40.

Next, an operation of the communication apparatus 1 when transmitting a signal will be described.

The transmission circuit 20 generates a modulated wave signal as a transmission signal, which is in turn transferred to the common antenna section 40. The modulated wave signal generated by the transmission circuit 20 is transmitted via the common antenna section 40 from the antenna section 50 by wireless communication. The transmission circuit 20 will be described elsewhere in detail below. Note that the reception circuit 30, the common antenna section 40, and the antenna section 50 are also provided in general communication apparatuses and will not be explained.

Note that the present invention is directed to the transmission circuit 20. Therefore, in the communication apparatus 1, the reception circuit 30 and the common antenna section 40 are involved in the reception operation, and therefore, are not indispensable.

Hereinafter, embodiments of the transmission circuit 20 of the present invention will be described with reference to the drawings.

Embodiment 1

Figure 2:
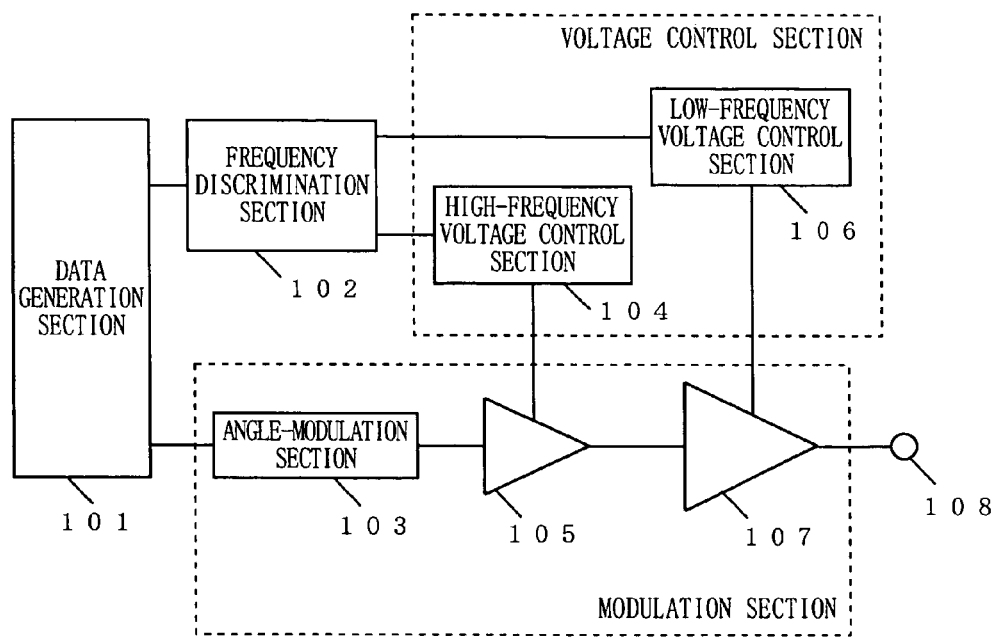
FIG. 2 is a block diagram showing an exemplary structure of a transmission circuit 20 according to Embodiment 1 of the present invention.

FIG. 2 is a block diagram showing an exemplary structure of a transmission circuit 20 according to Embodiment 1 of the present invention. Referring to FIG. 2, the transmission circuit 20 comprises a data generation section 101, the frequency discrimination section 102, an angle-modulation section 103, a high-frequency voltage control section 104, a low-frequency voltage control section 106, an amplitude modulation section 105, an amplitude modulation section 107, and an output terminal 108.

Note that the high-frequency voltage control section 104 and the low-frequency voltage control section 106 can be combined into one voltage control section. The angle-modulation section 103, the amplitude modulation section 105, and the amplitude modulation section 107 can be combined into one modulation section.

Referring to FIG. 2, the data generation section 101 generates, based on data to be transmitted, a signal containing an amplitude data component (amplitude signal) and a signal containing a phase data component (phase signal). The amplitude signal is input to the frequency discrimination section 102. The frequency discrimination section 102 separates the input amplitude signal into a high-frequency amplitude component signal (high-frequency amplitude signal) and a low-frequency amplitude component signal (low-frequency amplitude signal), which are in turn output to the high-frequency voltage control section 104 and the low-frequency voltage control section 106, respectively. On the other hand, the phase signal is input to the angle-modulation section 103. The angle-modulation section 103 angle-modulates the input phase signal and outputs the resultant angle-modulated wave signal.

The high-frequency voltage control section 104 and the low-frequency voltage control section 106 control output voltages based on the input amplitude signals, and output the controlled voltages to the amplitude modulation section 105 and the amplitude modulation section 107, respectively. The amplitude modulation section 105 and the amplitude modulation section 107 amplitude-modulate the input signals based on the voltages supplied from the high-frequency voltage control section 104 and the low-frequency voltage control section 106, respectively, and output the resultant modulated wave signals.

The frequency discrimination section 102, the high-frequency voltage control section 104, and the low-frequency voltage control section 106 will be described in detain elsewhere below.

Figure 24:
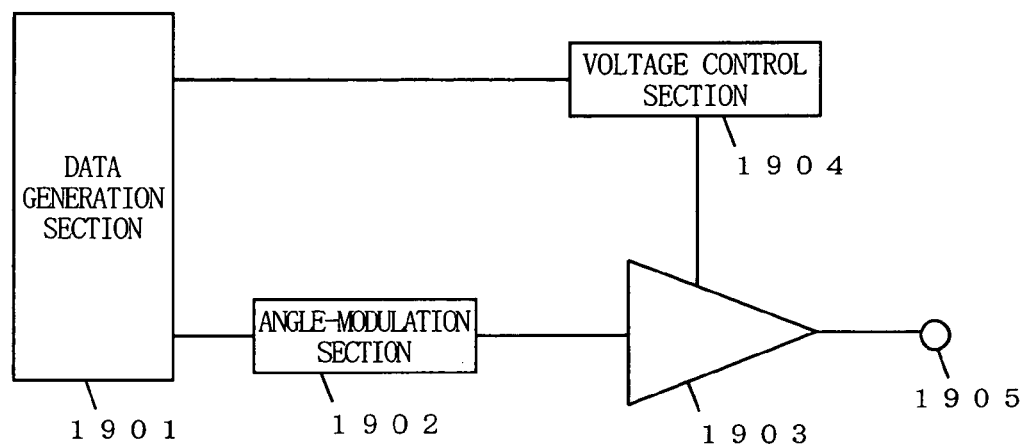
FIG. 24 is a block diagram showing an exemplary structure of a conventional transmission circuit employing polar modulation.

Note that the data generation section 101, the angle-modulation section 103, the amplitude modulation section 105, the amplitude modulation section 107, and the output terminal 108 have structures similar to those of the transmission circuit employing polar modulation of FIG. 24 which have been described in the Description of the Background Art and will not be explained in detail.

Firstly, the frequency discrimination section 102 will be described in detail.

Figure 7:
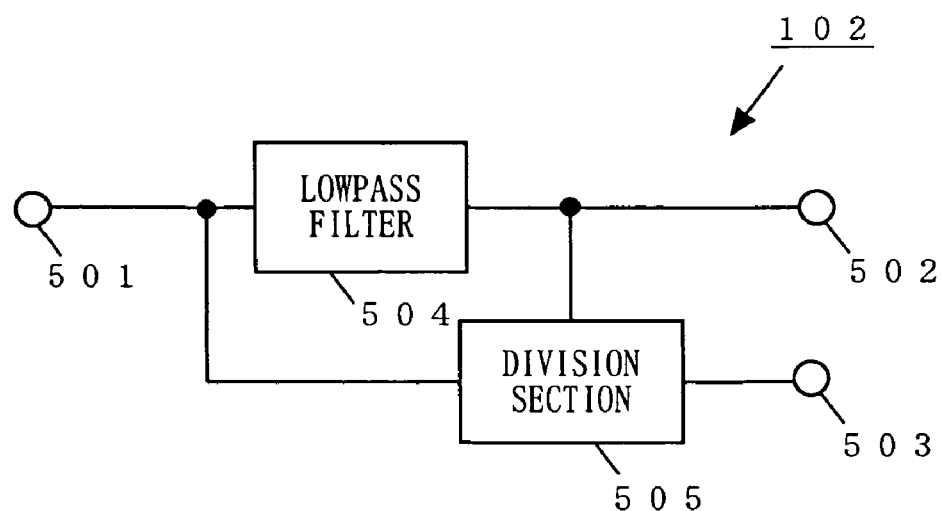
FIG. 7 is a block diagram showing an exemplary structure of a frequency discrimination section 102 of FIG. 2.

FIG. 7 is a block diagram showing an exemplary structure of the frequency discrimination section 102 of FIG. 2. Referring to FIG. 7, the frequency discrimination section 102 comprises an input terminal 501, an output terminal 502, an output terminal 503, a lowpass filter 504, and a division section 505.

Referring to FIG. 7, the input terminal 501 is connected to the data generation section 101 and receives an amplitude signal. The amplitude signal is input to the lowpass filter 504 and the division section 505. The lowpass filter 504 extracts a component (low-frequency amplitude signal) having a frequency lower than a predetermined frequency from the input amplitude signal, and outputs the component to the output terminal 502 and the division section 505. The output terminal 502 is connected to the low-frequency voltage control section 106, and outputs the low-frequency amplitude signal to the low-frequency voltage control section 106. The division section 505 outputs a high-frequency component (high-frequency amplitude signal) which is obtained by dividing the amplitude signal by the low-frequency component, to the output terminal 503. The output terminal 503 is connected to the high-frequency voltage control section 104 and outputs the high-frequency amplitude signal to the high-frequency voltage control section 104.

Note that the lowpass filter 504 and the division section 505 have the same structures as those generally used and will not be explained in detail.

Next, the high-frequency voltage control section 104 and the low-frequency voltage control section 106 will be described in detail.

Figure 20:
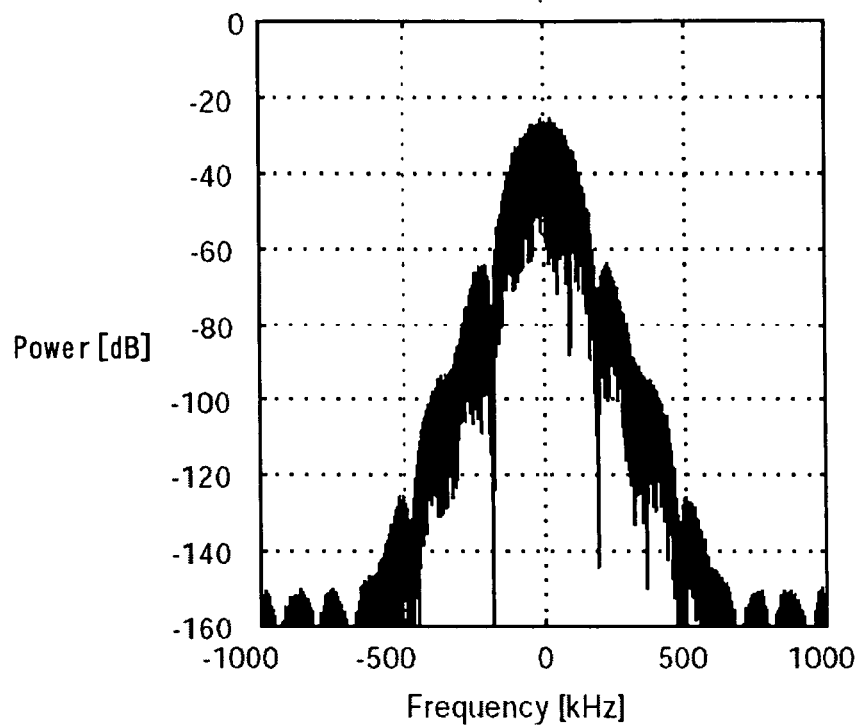
FIG. 20 is a diagram showing a spectrum of a modulated wave signal output from the transmission circuit 20.
Figure 21:
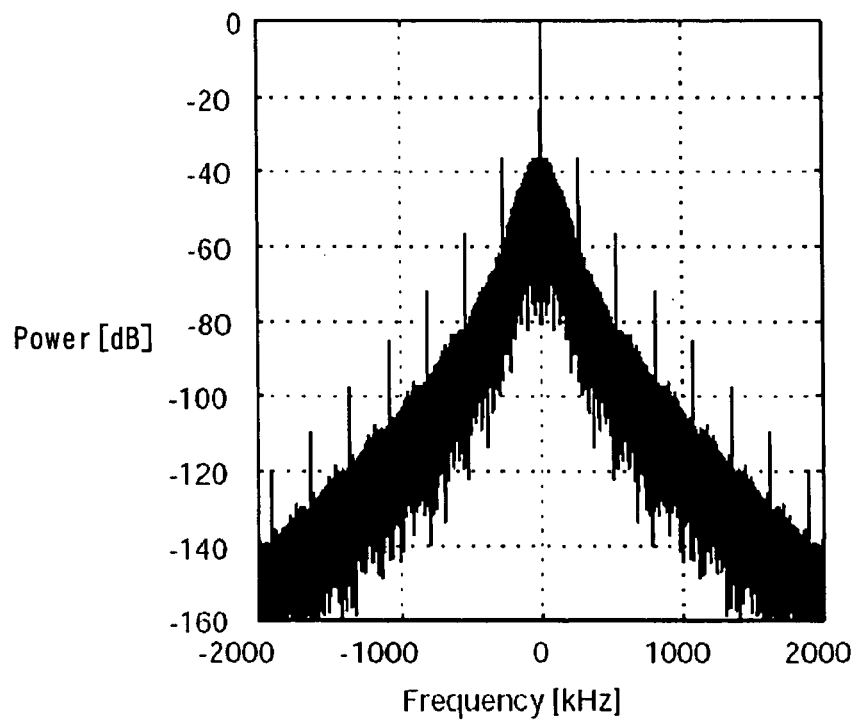
FIG. 21 shows a spectrum of an amplitude signal M(t) output from a data generation section 101.

It is assumed that the transmission circuit 20 of Embodiment 1 employs, for example, EDGE (Enhanced Data rate GSM Evolution) as a technique for generating a modulated wave signal. In this case, FIG. 20 shows a spectrum of a modulated wave signal output from the transmission circuit 20. In FIG. 20, the horizontal axis (frequency) indicates a deviation of the modulated wave signal from a center frequency. FIG. 21 shows a spectrum of an amplitude signal M(t) output from the data generation section 101.

Referring to FIG. 21, the spectrum of the amplitude signal M(t) is spread in a broader band than that of the spectrum of the modulated wave signal of FIG. 20, and energy is concentrated into a low-frequency region. Therefore, the amplitude signal M(t) is characterized in that energy is low in a high-frequency region (high-frequency amplitude signal) while energy is high in a low-frequency region (low-frequency amplitude signal). Note that this feature is established not only when EDGE is used as a modulation technique but also when W-CDMA or the like is used. Therefore, by reducing power when processing the low-frequency amplitude signal having high energy, the total power consumption of the transmission circuit 20 can be effectively reduced.

Figure 25:
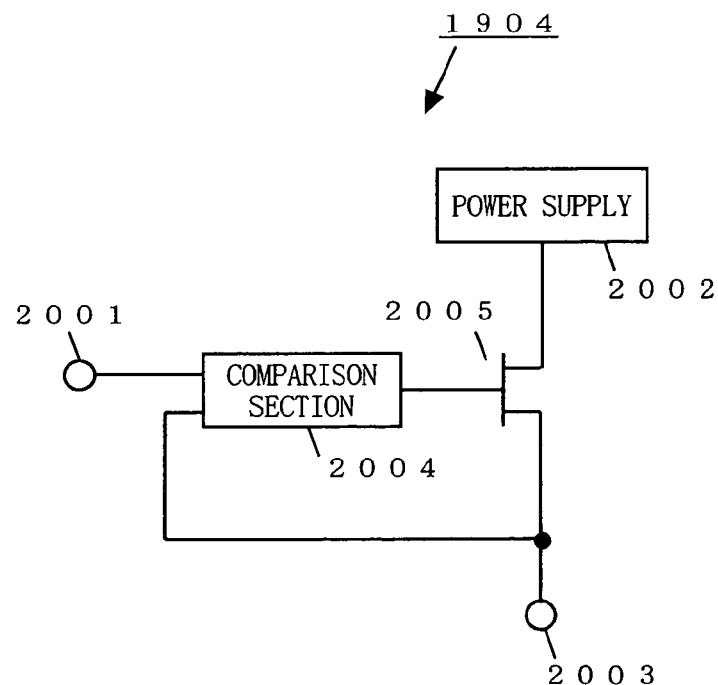
FIG. 25 is a block diagram showing an exemplary structure of a voltage control section employing a series regulator.
Figure 26:
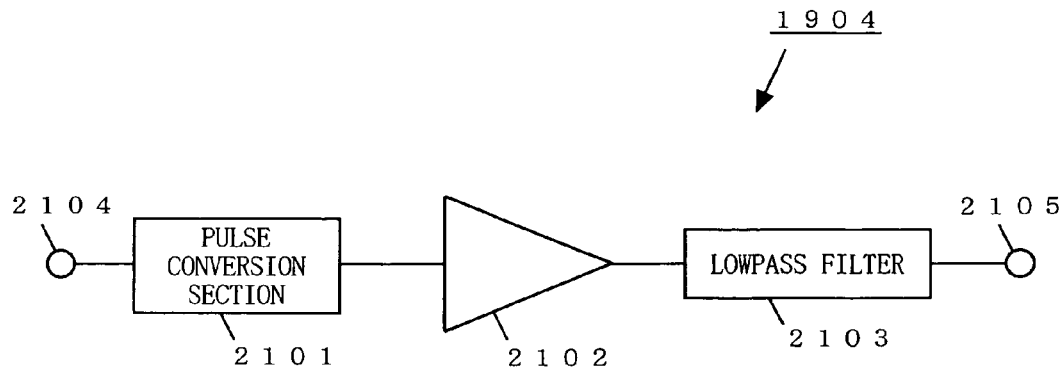
FIG. 26 is a block diagram showing an exemplary structure of a voltage control section employing a switching regulator.
Figure 27:
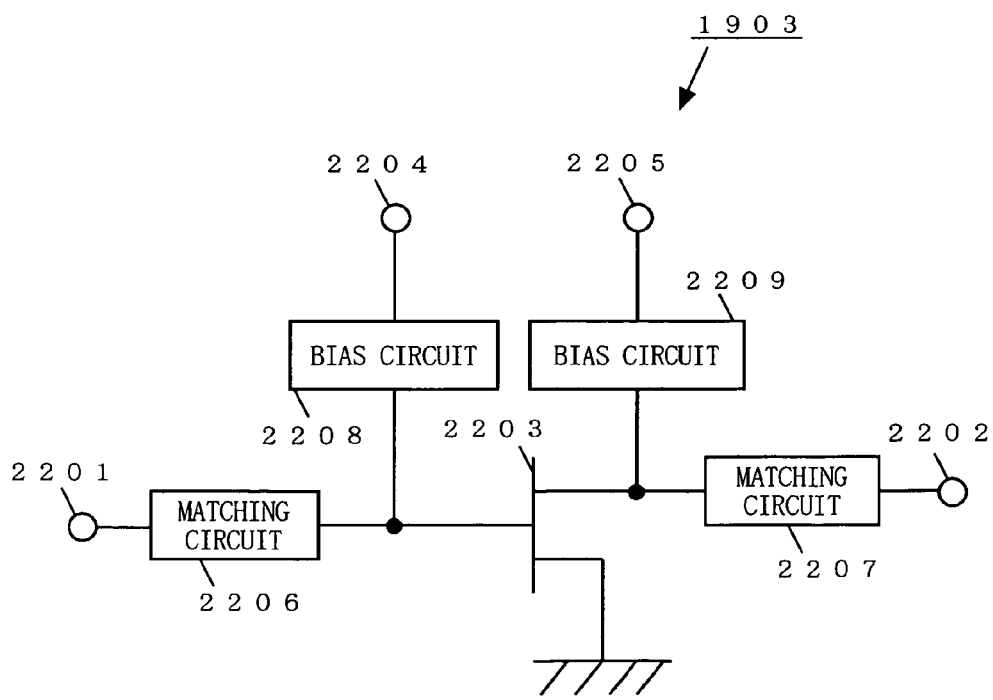
FIG. 27 is a block diagram showing an exemplary structure of an amplitude modulation section 1903 of FIG. 24.

Therefore, the high-frequency amplitude signal having low energy is suitable for process using a voltage control section employing a series regulator, such as that of FIG. 25, which is good at operation in a broad band, but has low power efficiency. Conversely, the low-frequency amplitude signal having high energy is suitable for process using a voltage control section employing a switching regulator, such as that of FIG. 26, which has difficulty in operating in a broad band, but has high power efficiency.

Specifically, the transmission circuit 20 uses a voltage control section employing a series regulator, such as that of FIG. 25, as the high-frequency voltage control section 104. The transmission circuit 20 also uses a voltage control section employing a switching regulator, such as that of FIG. 26, as the low-frequency voltage control section 106. Further, in the transmission circuit 20, the low-frequency voltage control section 106 with high efficiency is disposed at a subsequent stage of the high-frequency voltage control section 104, whereby the amplitude modulation section 107, which requires larger power than that of the amplitude modulation section 105, can be operated efficiently.

Next, an operation of the transmission circuit 20 of Embodiment 1 of the present invention will be described.

Referring to FIG. 2, the data generation section 101 generates the amplitude signal M(t) and a phase signal φ(t) based on data to be transmitted. The phase signal φ(t) is input to the angle-modulation section 103 for angle modulation. The angle-modulated signal (angle-modulated wave signal) P(t) is represented by:

$$P(t)=\cos(\omega t+\phi(t)) \quad (1)$$

where $\omega$ represents an angular frequency and t represents time. The angle-modulated wave signal P(t) is input to the amplitude modulation section 105.

On the other hand, the amplitude signal M(t) is input to the frequency discrimination section 102. The amplitude signal M(t) received by the frequency discrimination section 102 is separated into a high-frequency amplitude signal Mh(t) and a low-frequency amplitude signal Ml(t). The high-frequency amplitude signal Mh(t) is input to the high-frequency voltage control section 104. The low-frequency amplitude signal Ml(t) is input to the low-frequency voltage control section 106. The relationship between Ml(t) and Mh(t) satisfies:

$$M(t)=A \cdot Ml(t) \cdot Mh(t) \quad (2)$$

where A is a constant.

The high-frequency voltage control section 104 supplies a voltage which has been controlled using the high-frequency amplitude signal Mh(t) to the amplitude modulation section 105. The amplitude modulation section 105 amplitude-modulates the angle-modulated wave signal input from the angle-modulation section 103 using the voltage supplied from the high-frequency voltage control section 104, and outputs a first modulated wave signal P1(t). The first modulated wave signal P1(t) can be represented by:

$$P1(t)=Ah \cdot Mh(t)\cos(\omega t+\phi(t)) \quad (3)$$

where Ah is a constant. The first modulated wave signal P1(t) is input to the amplitude modulation section 107.

Next, the non-linearity of an output signal (modulated wave signal) will be described, which causes a problem when an input signal (first modulated wave signal) is amplitude-modulated in the amplitude modulation section 107. The problem with the non-linearity of the modulated wave signal is that the distortion (non-linearity) of the waveform of a carrier wave reduces the quality of modulation.

Figure 22:
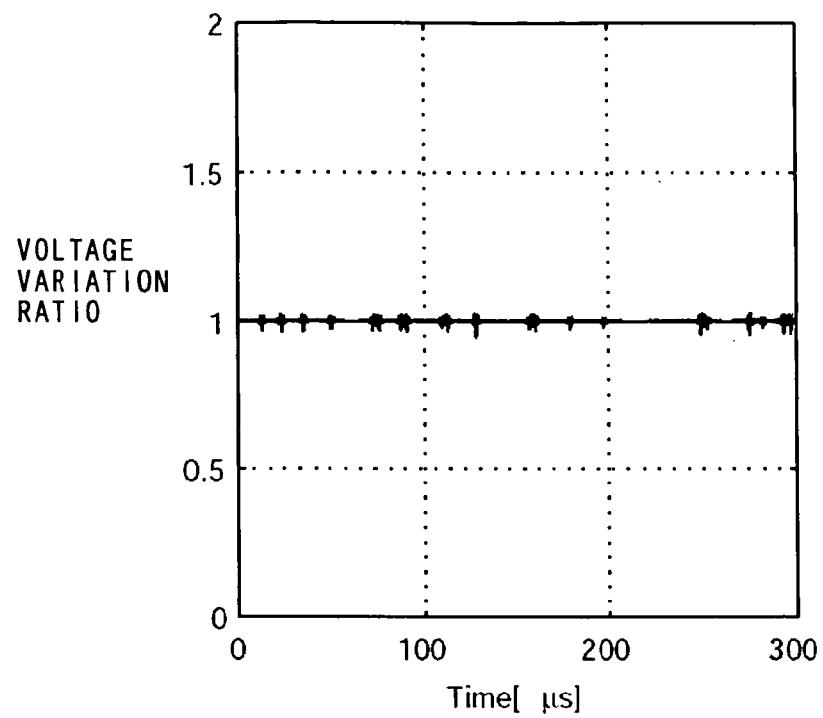
FIG. 22 is a diagram showing a waveform of a high-frequency amplitude signal Mh(t) separated by a frequency discrimination section 102.

Referring to FIG. 2, for example, it is assumed that the frequency discrimination section 102 performs frequency discrimination for the spectrum of the amplitude signal M(t) of FIG. 21 with reference to 500 kHz. In other words, the frequency discrimination section 102 is assumed to separate the amplitude signal M(t) into the high-frequency amplitude signal Mh(t) and the low-frequency amplitude signal Ml(t). FIG. 22 shows a waveform of the high-frequency amplitude signal Mh(t) separated by the frequency discrimination section 102. Referring to FIG. 22, the energy of the waveform of the high-frequency amplitude signal Mh(t) is concentrated into a DC component. In other words, it is shown that the waveform of the high-frequency amplitude signal Mh(t) has a small variation ratio.

Figure 23:
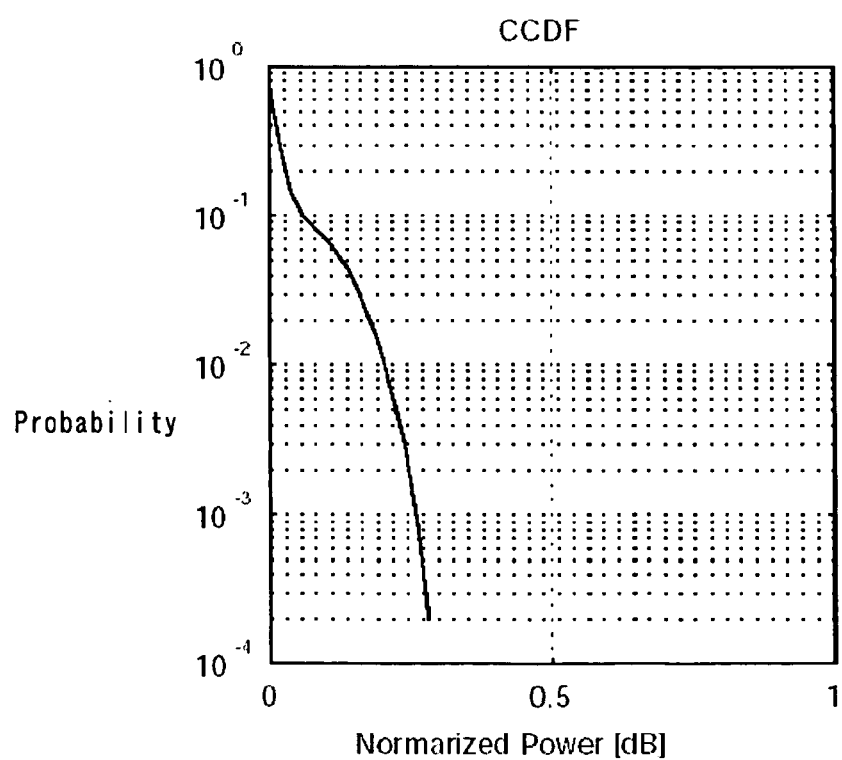
FIG. 23 is a diagram showing a CCDF of a first modulated wave signal output from an amplitude modulation section 105.

For example, it is now assumed that the amplitude modulation section 105 amplitude-modulates a phase signal using the high-frequency amplitude signal Mh(t) of FIG. 22. FIG. 23 shows a CCDF (complementary cumulative distribution function) of the first modulated wave signal output from the amplitude modulation section 105. Referring to FIG. 23, the CCDF of the first modulated wave signal has a considerably small variation in the intensity of an envelope (peak factor), i.e., the envelope is a substantially constant envelope.

The amplitude modulation section 107 also needs to be operated in a saturation region (non-linear region). Therefore, in the amplitude modulation section 107, when the envelope of the signal (first modulated wave signal) output by the amplitude modulation section 105 has a large variation, an output signal is disadvantageously non-linear in the saturation region. However, as can be seen from FIG. 23, the variation in the envelope of the first modulated wave signal is small. Therefore, in the amplitude modulation section 107, it can be confirmed that substantially no problem arises in the non-linearity of the modulated wave signal. Note that the variation in the envelope of the first modulated wave signal can be reduced with an increase in the cut-off frequency of the frequency discrimination section 102.

The description of the operation of the transmission circuit 20 according to Embodiment 1 of the present invention is resumed.

On the other hand, the low-frequency voltage control section 106 controls an output voltage using the input low-frequency amplitude signal Ml(t), and supplies the voltage to the amplitude modulation section 107. The amplitude modulation section 107 amplitude-modulates the first modulated wave signal input from the amplitude modulation section 105 using the voltage supplied from the the low-frequency voltage control section 106, and outputs a second modulated wave signal. The second modulated wave signal P2(t) is represented by:

$$P2(t)=Ah \cdot Al \cdot Mh(t) \cdot Ml(t)\cos(\omega t+\phi(t)) \quad (4);$$

and taking expression (2) into account, $$P2(t)=(Ah \cdot Al/A) \cdot M(t)\cos(\omega t+\phi(t)) \quad (5)$$

where Al is a constant. The second modulated wave signal represented by expression (5) is output from the output terminal 108. Note that a delay occurring in each path of FIG. 2 is assumed to be negligible.

As described above, the transmission circuit 20 of Embodiment 1 generates and outputs the modulated wave signal P2(t) represented by expression (5) based on the amplitude data M(t) and the phase data φ(t).

Note that, when an output level of the signal (modulated wave signal) transmitted from the amplitude modulation section 107 is lower than a threshold defining a predetermined signal intensity, the frequency discrimination section 102 may reduce a predetermined frequency threshold for use in frequency discrimination in a stepwise manner, corresponding to the output level of the signal. Specifically, the frequency discrimination section 102 outputs a signal (DC or near-DC signal) whose energy is concentrated into a DC component in a stepwise manner, as the low-frequency amplitude signal Ml(t). The reason will be described below.

In Embodiment 1 of the present invention, when it is necessary to control an output level of the transmission circuit 20, the amplitude modulation section 105 and the amplitude modulation section 107 need to secure the linearity of the output signal with respect to the power source voltage over a wide dynamic range.

Particularly, it is difficult for the amplitude modulation section 107 to hold the linearity of the output signal with respect to a voltage input from the low-frequency voltage control section 106 in a region where the output signal is small. When the output level of the signal transmitted from the amplitude modulation section 107 is smaller than the threshold defining the predetermined signal intensity, the frequency discrimination section 102 reduces the predetermined cut-off frequency for use in frequency discrimination in a stepwise manner, corresponding to the output level of the signal. As a result, the frequency discrimination section 102 outputs the low-frequency amplitude signal Ml(t) whose energy is concentrated into a DC component. In this case, the low-frequency voltage control section 106 supplies a near-DC voltage to the amplitude modulation section 107, but not the voltage which has been controlled using the amplitude signal.

When the output level of the signal transmitted from the amplitude modulation section 107 is sufficiently small, the transmission circuit 20 causes the low-frequency amplitude signal to be a direct current, and performs amplitude modulation using only the amplitude modulation section 105. In this case, the amplitude modulation section 107 serves as an amplifier. As a result, the transmission circuit 20 can hold the linearity of the output signal.

When the output transmitted from the amplitude modulation section 107 is further smaller than the threshold defining the predetermined signal intensity, the low-frequency voltage control section 106 may reduce the DC voltage to be supplied to the amplitude modulation section 107 to reduce power consumption. As a result, the transmission circuit 20 can further reduce power consumption while holding the linearity of the output signal.

Each component of the transmission circuit 20 is a digital or analog circuit. For example, in the transmission circuit 20, the data generation section 101, the frequency discrimination section 102 and the angle modulation section 103 are digital circuits, while the high-frequency voltage control section 104, the low-frequency voltage control section 106, the amplitude modulation section 105 and the amplitude modulation 107 are analog circuits.

As described above, the transmission circuit 20 of Embodiment 1 of the present invention generates an amplitude signal and a phase signal based on data to be transmitted. Next, the phase signal is angle-modulated, and the amplitude signal is separated into a high-frequency amplitude signal and a low-frequency amplitude signal. Therefore, it is possible to use the high-frequency amplitude signal and the low-frequency amplitude signal separately to amplitude-modulate the angle-modulated phase signal. In other words, the transmission circuit 20 gives a higher priority to broad-band operation rather than power efficiency when amplitude modulation is performed using the high-frequency amplitude signal, and gives a higher priority to power efficiency rather than broad-band operation when amplitude modulation is performed using the low-frequency amplitude signal. Thus, the transmission circuit 20 can perform broad-band operation and minimize total power consumption.

Embodiment 2

Figure 3:
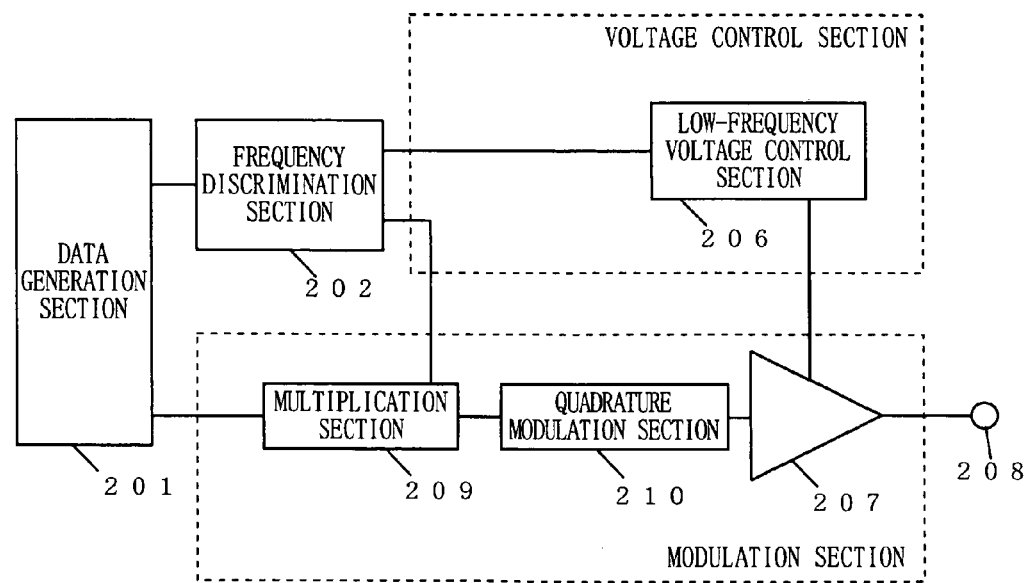
FIG. 3 is a block diagram showing an exemplary structure of a transmission circuit 20 according to Embodiment 2 of the present invention.

FIG. 3 is a block diagram showing an exemplary structure of a transmission circuit 20 according to Embodiment 2 of the present invention. The transmission circuit 20 of Embodiment 2 is different from that of Embodiment 1 in the following points. In Embodiment 2, a data generation section 201 outputs a quadrature signal in place of a phase signal. In addition, the angle-modulation section 103, the high-frequency voltage control section 104, and the amplitude modulation section 105 of Embodiment 1 are replaced with a multiplication section 209 and a quadrature modulation section 210 in Embodiment 2.

Referring to FIG. 3, the transmission circuit 20 comprises the data generation section 201, a frequency discrimination section 202, the multiplication section 209, the quadrature modulation section 210, a low-frequency voltage control section 206, an amplitude modulation section 207, and an output terminal 208.

The data generation section 201 generates an amplitude signal and a quadrature signal based on data to be transmitted. The quadrature signal refers to a phase signal which is represented in an orthogonal coordinate system. The multiplication section 209 multiplies an input quadrature signal with an input high-frequency signal. The quadrature modulation section 210 quadrature-modulates an input signal.

Note that the frequency discrimination section 202, the low-frequency voltage control section 206, the amplitude modulation section 207, and the output terminal 208 are similar to those of Embodiment 1 and will not be explained.

The low-frequency voltage control section 106 can be used as the voltage control section 206. The multiplication section 209, the quadrature modulation section 210, and the amplitude modulation section 207 can be combined into one modulation section.

Next, an operation of the transmission circuit 20 according to Embodiment 2 of the present invention will be described.

Referring to FIG. 3, the data generation section 201 generates an amplitude signal M(t) and a quadrature signal D(t) based on data to be transmitted. Note that the quadrature signal D(t) is obtained by representing a phase signal φ(t) in the orthogonal coordinate system as follows:

$$D(t)=(\cos\phi(t), \sin\phi(t)) \qquad (6).$$

The amplitude signal M(t) is input to the frequency discrimination section 202, which in turn separates the signal into a high-frequency amplitude signal Mh(t) and a low-frequency amplitude signal Ml(t). The high-frequency amplitude signal Mh(t) is input to the multiplication section 209. The low-frequency amplitude signal Ml(t) is input to the low-frequency voltage control section 206. Note that a relationship between Ml(t) and Mh(t) satisfies expression (2) of Embodiment 1.

Figure 4:
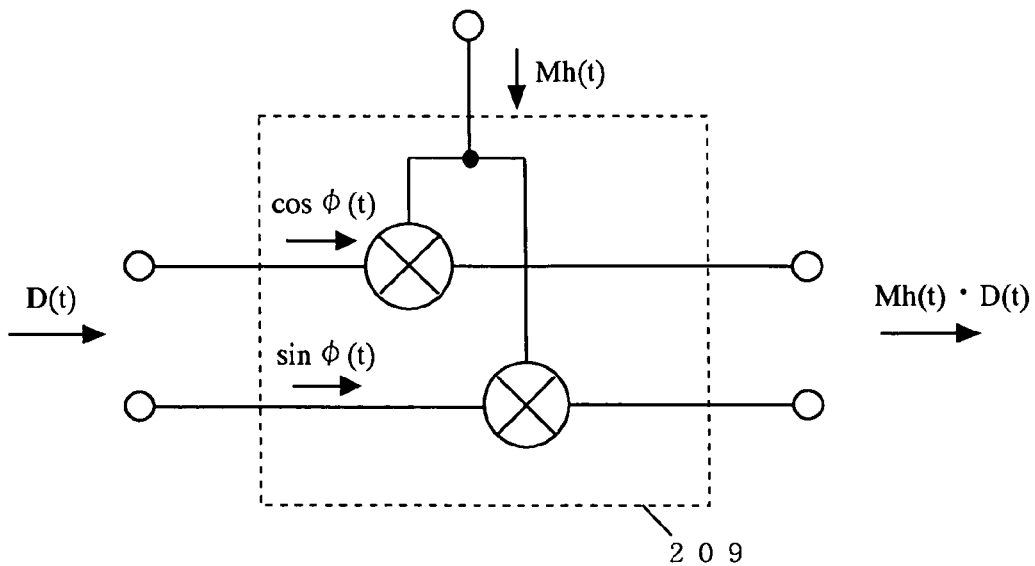
FIG. 4 is a block diagram showing an exemplary structure of a multiplication section 209.

Next, the quadrature signal D(t) is input to the multiplication section 209. FIG. 4 is a block diagram showing an exemplary structure of the multiplication section 209. Referring to FIG. 4, the multiplication section 209 multiplies the quadrature signal D(t) with the high-frequency amplitude signal Mh(t) and outputs the resultant signal Mh(t)·D(t). The quadrature modulation section 210 quadrature-modulates the signal Mh(t) D(t) output from the multiplication section 209 and outputs the resultant quadrature-modulated wave signal P1(t). The quadrature-modulated wave signal P1(t) can be represented by:

$$P1(t)=Ah \cdot Mh(t)\cos(\varpi t+\phi(t)) \qquad (7)$$

where $\varpi$ is an angular frequency and Ah is a constant. The quadrature-modulated wave signal P1(t) is input to the amplitude modulation section 207.

On the other hand, the low-frequency voltage control section 206 controls an output voltage using the input low-frequency amplitude signal Ml(t) and supplies the resultant voltage to the amplitude modulation section 207. The amplitude modulation section 207 amplitude-modulates the quadrature-modulated wave signal P1(t) received from the quadrature modulation section 210 using the voltage supplied from the low-frequency voltage control section 206 and outputs the resultant modulated wave signal P2(t). The modulated wave signal P2(t) is represented by:

$$P2(t)=Ah \cdot Al \cdot Mh(t) \cdot Ml(t)\cos(\varpi t+\phi(t)) \quad (8),$$

and taking expression (2) into account, $$P2(t)=(Ah \cdot Al/A) \cdot M(t)\cos(\varpi t+\phi(t)) \quad (9)$$

where Al is a constant. In other words, the modulated wave signal represented by expression (9) is output from the output terminal 208. Note that a delay occurring in each path of FIG. 3 is assumed to be negligible.

As described above, the transmission circuit 20 of Embodiment 2 generates and outputs the modulated wave signal P2(t) represented by expression (9) based on the amplitude signal M(t) and the quadrature signal D(t).

Note that, when an output level of the signal (modulated wave signal) transmitted from the amplitude modulation section 207 is lower than a threshold defining a predetermined signal intensity, the frequency discrimination section 202 may reduce a predetermined frequency threshold for use in frequency discrimination in a stepwise manner, corresponding to the output level of the signal. Specifically, the frequency discrimination section 202 outputs a signal (DC or near-DC signal) whose energy is concentrated into a DC component in a stepwise manner, as the low-frequency amplitude signal Ml(t). The reason is similar to that described in Embodiment 1.

When the output transmitted from the amplitude modulation section 207 is further smaller than the threshold defining the predetermined signal intensity, the low-frequency voltage control section 206 may decrease the DC voltage to be supplied to the amplitude modulation section 207 to reduce power consumption. As a result, the transmission circuit 20 can further reduce power consumption while holding the linearity of the output signal.

For example, in the transmission circuit 20, the data generation section 201, the frequency discrimination section 202 and the multiplication section 209 are digital circuits, while the quadrature modulation section 210, the the low-frequency voltage control section 106 and the amplitude modulation 107 are analog circuits. Thereby, the transmission circuit 20 can use the digital circuits to perform multiplication of the high-frequency amplitude signal Mh. Therefore, as compared to Embodiment 1, the delay time can be easily adjusted.

As described above, the transmission circuit 20 of Embodiment 2 of the present invention generates an amplitude signal and a quadrature signal which is obtained by representing a phase signal in an orthogonal coordinate system, based on data to be transmitted. The amplitude signal is separated into a high-frequency amplitude signal and a low-frequency amplitude signal. Therefore, it is possible to use the high-frequency amplitude signal and the low-frequency amplitude signal separately to modulate the quadrature signal. In other words, the transmission circuit 20 gives a higher priority to broad-band operation rather than power efficiency when modulation is performed using the high-frequency amplitude signal, and gives a higher priority to power efficiency rather than broad-band operation when modulation is performed using the low-frequency amplitude signal. Thus, the transmission circuit 20 can perform broadband operation and minimize total power consumption.

Embodiment 3

Figure 5:
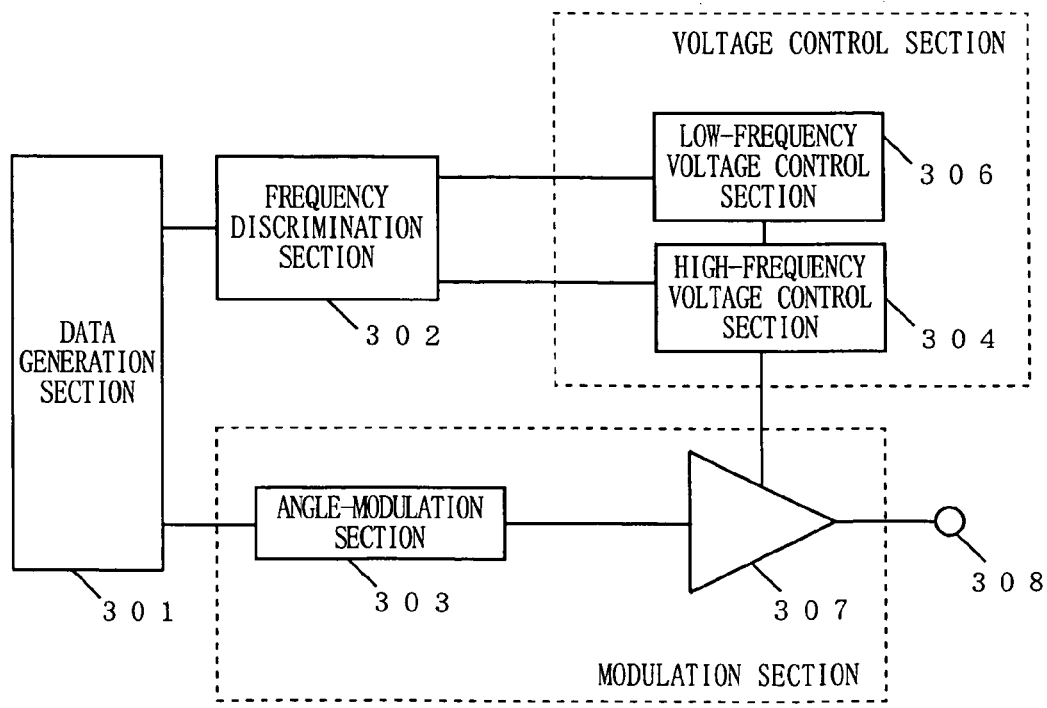
FIG. 5 is a block diagram showing an exemplary structure of a transmission circuit 20 according to Embodiment 3 of the present invention.

FIG. 5 is a block diagram showing an exemplary structure of a transmission circuit 20 according to Embodiment 3 of the present invention. The transmission circuit 20 of Embodiment 3 is different from that of Embodiment 1 in that a high-frequency voltage control section 304 and a low-frequency voltage control section 306 are connected in series.

Referring to FIG. 5, the transmission circuit 20 comprises a data generation section 301, a frequency discrimination section 302, an angle modulation section 303, the high-frequency voltage control section 304, the low-frequency voltage control section 306, an amplitude modulation section 307, and an output terminal 308. Note that these components are similar to those of Embodiment 1 and will not be explained.

The high-frequency voltage control section 304 and the low-frequency voltage control section 306 can be combined into one voltage control section. The angle modulation section 303 and the amplitude modulation section 307 can be combined into one modulation section.

Next, an operation of the transmission circuit 20 according to Embodiment 3 of the present invention will be described.

In the transmission circuit 20 of Embodiment 3, an operation until the frequency discrimination section 302 outputs a high-frequency amplitude signal Mh(t) and a low-frequency amplitude signal Ml(t) to the high-frequency voltage control section 304 and the low-frequency voltage control section 306, respectively, is similar to that of Embodiment 1. A relationship between Ml(t) and Mh(t) satisfies expression (2) described in Embodiment 1.

Next, the low-frequency amplitude signal Ml(t) is input to the low-frequency voltage control section 306. The low-frequency voltage control section 306 outputs a signal Al·Ml(t) which has been controlled using the low-frequency amplitude signal Ml(t) to the high-frequency voltage control section 304. Note that Al is a constant.

On the other hand, the high-frequency amplitude signal Mh(t) is input to the high-frequency voltage control section 304. The high-frequency voltage control section 304 controls the signal Al·Ml(t) output from the low-frequency voltage control section 306 using the high-frequency amplitude signal Mh(t) and outputs the resultant signal Al·Ah·Ml(t)·Mh(t) to the amplitude modulation section 307. Note that Ah is a constant.

Similar to Embodiment 1, the angle modulation section 303 outputs an angle-modulated wave signal P(t) represented by:

$$P(t)=\cos(\varpi t+\phi(t)) \quad (10).$$

The amplitude modulation section 307 amplitude-modulates the angle-modulated wave signal P(t) using the signal Al·Ah·Ml(t)·Mh(t) output from the high-frequency voltage control section 304. The modulated wave signal P2(t) output from the amplitude modulation section 307 is represented by:

$$P2(t)=Ah \cdot Al \cdot Mh(t) \cdot Ml(t)\cos(\varpi t+\phi(t)) \quad (11),$$

and taking expression (2) into account, $$P2(t)=(Ah \cdot Al/A) \cdot M(t)\cos(\varpi t+\phi(t)) \quad (12).$$

In other words, the modulated wave signal represented by expression (12) is output to the output terminal 308. Note that a delay occurring in each path of FIG. 5 is assumed to be negligible.

As described above, the transmission circuit 20 of Embodiment 3 generates and outputs the modulated wave signal P2(t) represented by expression (12) based on the amplitude data M(t) and the phase data φ(t).

Note that, when an output level of the signal (modulated wave signal) transmitted from the amplitude modulation section 307 is lower than a threshold defining a predetermined signal intensity, the frequency discrimination section 302 may reduce a predetermined frequency threshold for use in frequency discrimination in a stepwise manner, corresponding to the output level of the signal. Specifically, the frequency discrimination section 302 outputs a signal (DC or near-DC signal) whose energy is concentrated into a DC component in a stepwise manner, as the low-frequency amplitude signal Ml(t). The reason is similar to that described in Embodiment 1.

When the output transmitted from the amplitude modulation section 307 is further smaller than the threshold defining the predetermined signal intensity, the low-frequency voltage control section 306 may decrease the DC voltage to be supplied to the amplitude modulation section 307 to reduce power consumption. As a result, the transmission circuit 20 can further reduce power consumption while holding the linearity of the output signal.

Figure 6:
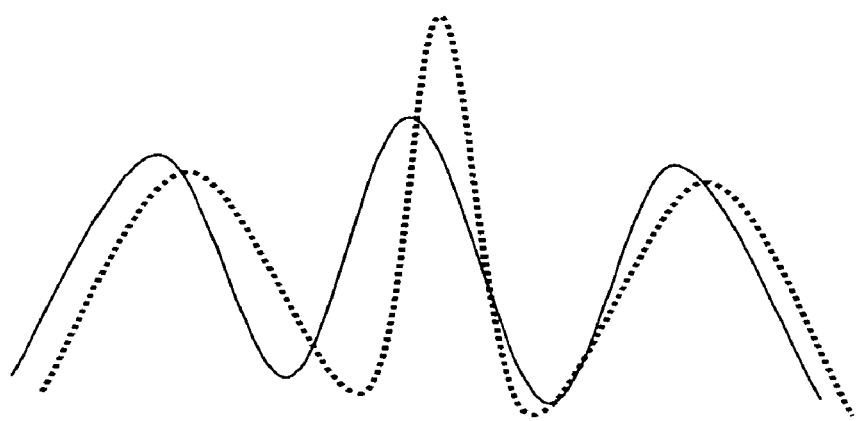
FIG. 6 is a diagram showing a relationship between an input voltage and an output voltage in a high-frequency voltage control section 304.

When the series regulator is used in the high-frequency voltage control section 304 as described above, the high-frequency voltage control section 304 cannot supply an output voltage higher than an input voltage to the amplitude modulation section 307. Therefore, when the high-frequency voltage control section 304 is connected to the low-frequency voltage control section 306 in series, there is a possibility that the high-frequency voltage control section 304 cannot supply a desired voltage to the amplitude modulation section 307. FIG. 6 is a diagram showing a relationship between an input voltage and an output voltage in the high-frequency voltage control section 304. Referring to FIG. 6, a dotted line indicates an ideal voltage output from the high-frequency voltage control section 304 (hereinafter referred to as an ideal output voltage). A solid line indicates a voltage input from the low-frequency voltage control section 306 (hereinafter referred to as an input voltage). When the high-frequency voltage control section 306 tries to obtain an output voltage higher than an input voltage (i.e., a region in which the dotted line is higher than the solid line), it is difficult to obtain the ideal output voltage (dotted line) even in the case of high-speed operation. In this situation, for example, the high-frequency voltage control section 304 can obtain the ideal output voltage using an input voltage previously multiplied with a predetermined constant a, which is supplied from the low-frequency voltage control section 306.

As described above, according to the transmission circuit 20 of Embodiment 3 of the present invention, the high-frequency voltage control section 304 and the low-frequency voltage control section 306 are connected in series, thereby making it possible to reduce a delay time between the low-frequency amplitude signal and the high-frequency amplitude signal as compared to the transmission circuit 20 of Embodiment 1.

Embodiment 4

Figure 8:
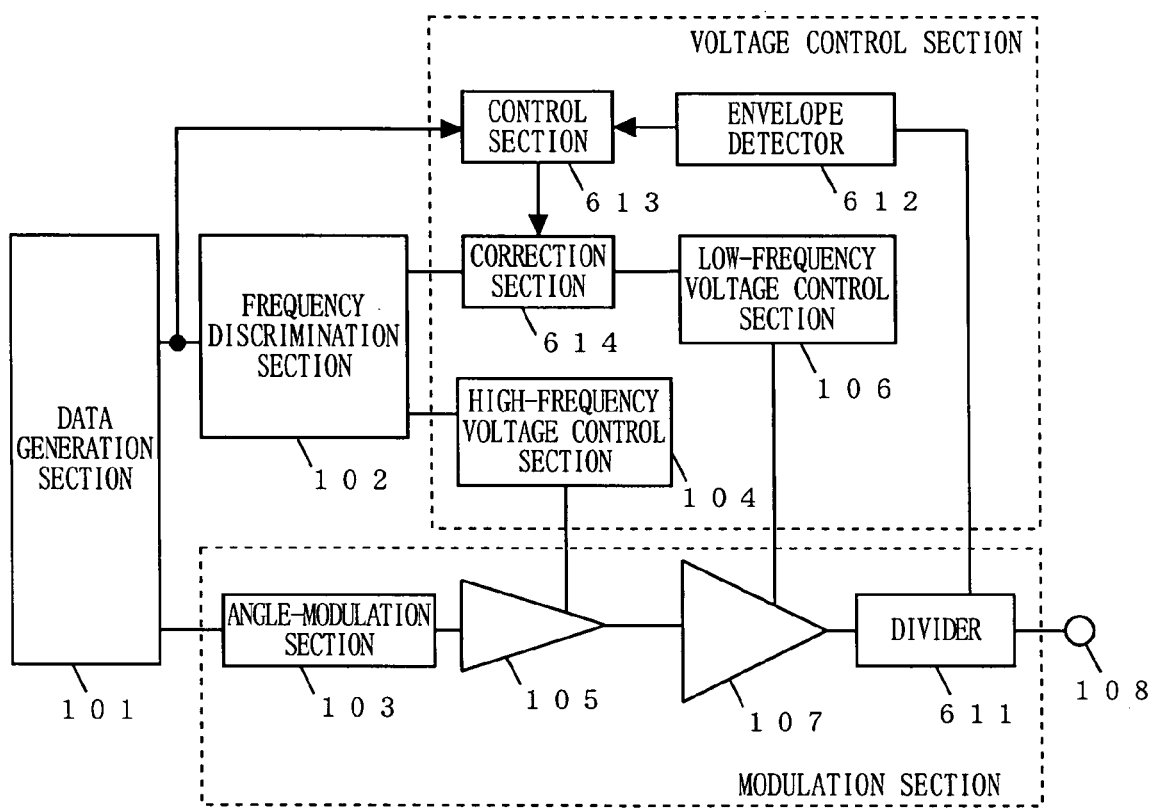
FIG. 8 is a block diagram showing an exemplary structure of a transmission circuit 20 according to Embodiment 4 of the present invention.

FIG. 8 is a block diagram showing an exemplary structure of a transmission circuit 20 according to Embodiment 4 of the present invention. The transmission circuit 20 of Embodiment 4 is different from that of Embodiment 1 in that a correction control is performed between a low-frequency amplitude signal and a high-frequency amplitude signal which are output from the frequency discrimination section 102. The transmission circuit 20 of Embodiment 4 further comprises a divider 611, an envelope detector 612, a control section 613, and a correction section 614 in addition to the components of the transmission circuit 20 of Embodiment 1.

Referring to FIG. 8, the transmission circuit 20 comprises the data generation section 101, the frequency discrimination section 102, the angle-modulation section 103, the high-frequency voltage control section 104, the low-frequency voltage control section 106, the amplitude modulation section 105, the amplitude modulation section 107, the output terminal 108, the divider 611, the envelope detector 612, the control section 613, and the correction section 614.

Note that the high-frequency voltage control section 104, the low-frequency voltage control section 106, the envelope detector 612, the control section 613, and the correction section 614 can be combined into one voltage control section. The angle-modulation section 103, the amplitude modulation section 105, the amplitude modulation section 107, and the divider 611 can be combined into one modulation section.

Referring to FIG. 8, the divider 611 divides an input signal into two or more. The envelope detector 612 detects an envelope from a modulated wave signal to output a post-modulation amplitude signal. The control section 613 controls the correction section 614 so that a shift between the low-frequency amplitude signal and the high-frequency amplitude signal which are contained in the post-modulation amplitude signal is eliminated. The correction section 614 delays a timing of outputting the low-frequency amplitude signal in accordance with the control section 613.

Note that the data generation section 101, the frequency discrimination section 102, the angle-modulation section 103, the high-frequency voltage control section 104, the low-frequency voltage control section 106, the amplitude modulation section 105, the amplitude modulation section 107, and the output terminal 108 are similar to those of Embodiment 1 and will not be explained.

Next, an operation of the transmission circuit 20 according to Embodiment 4 of the present invention will be described.

Referring to FIG. 8, an operation until the amplitude modulation section 107 outputs the modulated wave signal is similar to that of Embodiment 1.

The amplitude modulation section 107 outputs the modulated wave signal to the divider 611. The divider 611 outputs the input modulated wave signal to the envelope detector 612 and the output terminal 108. The envelope detector 612 detects an envelope from the modulated wave signal to extract a post-modulation amplitude signal, which is in turn output to the control section 613. The control section 613 compares the amplitude signal output from the data generation section 101 with the post-modulation amplitude signal output from the envelope detector 612, and controls the correction section 614 so that a shift between the low-frequency amplitude signal and the high-frequency amplitude signal of the post-modulation amplitude signal is eliminated. The correction section 614 delays a timing of outputting the low-frequency amplitude signal to the low-frequency voltage control section 106 in accordance with an instruction from the control section 613.

Note that the control section 613 can compare the amplitude signal output from the data generation section 101 with the post-modulation amplitude signal by comparing, for example, relative waveforms of the two signals.

Although the correction section 614 is provided on the low-frequency voltage control section 106's side in the transmission circuit 20 of FIG. 8, the correction section 614 may be provided on the high-frequency voltage control section 104's side, or alternatively, may be provided on both the sides. In this case, the correction section 614 delays a timing of outputting the high-frequency amplitude signal or the low-frequency amplitude signal which are output from the frequency discrimination section 102, to the high-frequency voltage control section 104 or the low-frequency voltage control section 106, respectively, in accordance with an instruction from the control section 613.

Note the correction section 614 may adjust a gain of at least one of the low-frequency amplitude signal and the high-frequency amplitude signal which have been separated by the frequency discrimination section 102, in accordance with an instruction from the control section 613 so that a shift between the two signals is eliminated.

Figure 9:
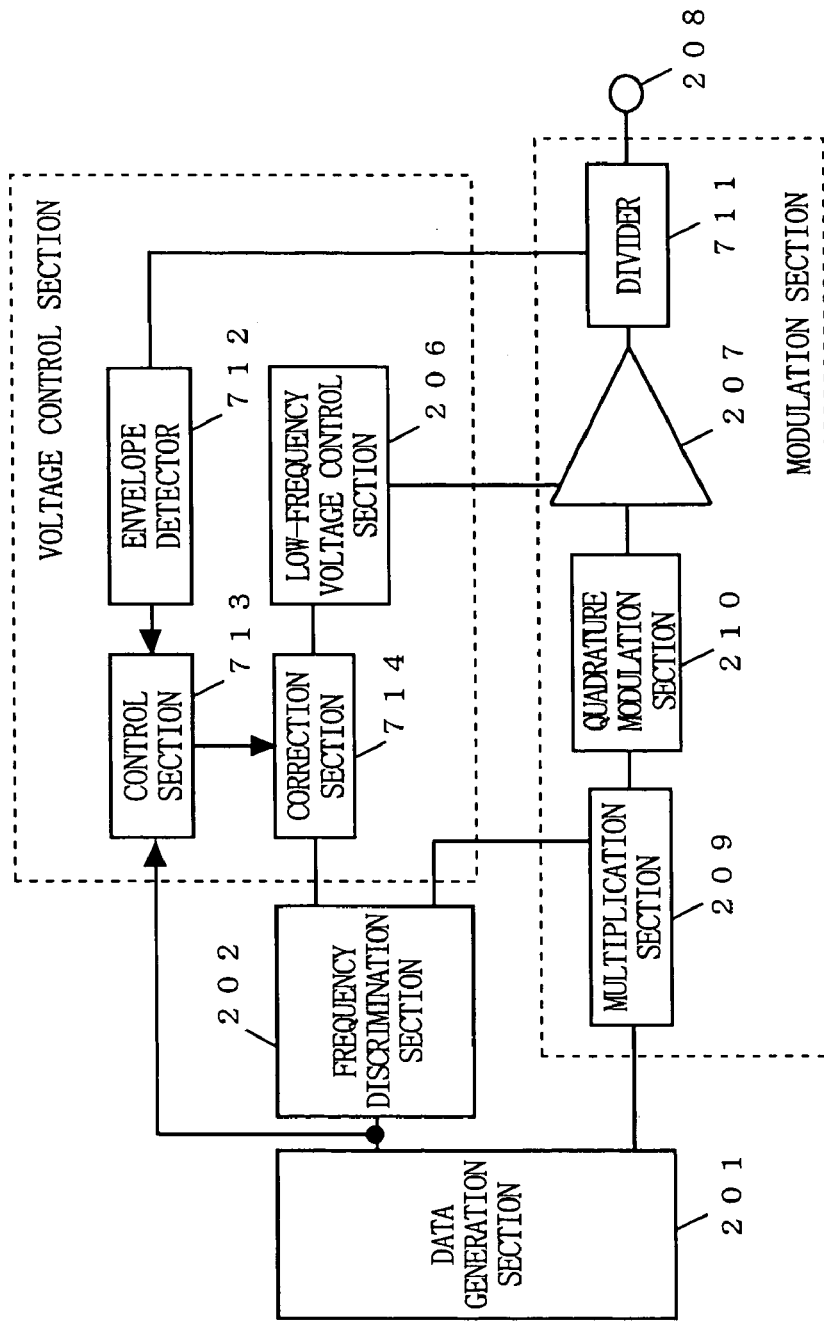
FIG. 9 is a block diagram showing an exemplary structure of the transmission circuit 20 of Embodiment 2 of FIG. 3 to which a correction control similar to that of Embodiment 4 is applied.

Note that the transmission circuit 20 of Embodiment 2 (FIG. 3) may be adapted to perform a correction control similar to that described above. FIG. 9 is a block diagram showing an exemplary structure of the transmission circuit 20 of Embodiment 2 of FIG. 3 to which a correction control similar to that of Embodiment 4 is applied. Referring to FIG. 9, the transmission circuit 20 comprises a divider 711, an envelope detector 712, a control section 713, and a correction section 714 in addition to the components of the transmission circuit 20 of Embodiment 2. According to the relationship between the high-frequency amplitude signal Mh(t) and the low-frequency amplitude signal Ml(t) in the amplitude modulation section 207, substantially no delay occurs in the high-frequency amplitude signal Mh(t). Therefore, in the transmission circuit 20, only a delay occurring in the low-frequency amplitude signal Ml(t) is adjusted. Therefore, the transmission circuit 20 can eliminate a shift between the low-frequency amplitude signal Ml(t) and the high-frequency amplitude signal Mh(t) by easy adjustment.

Figure 10:
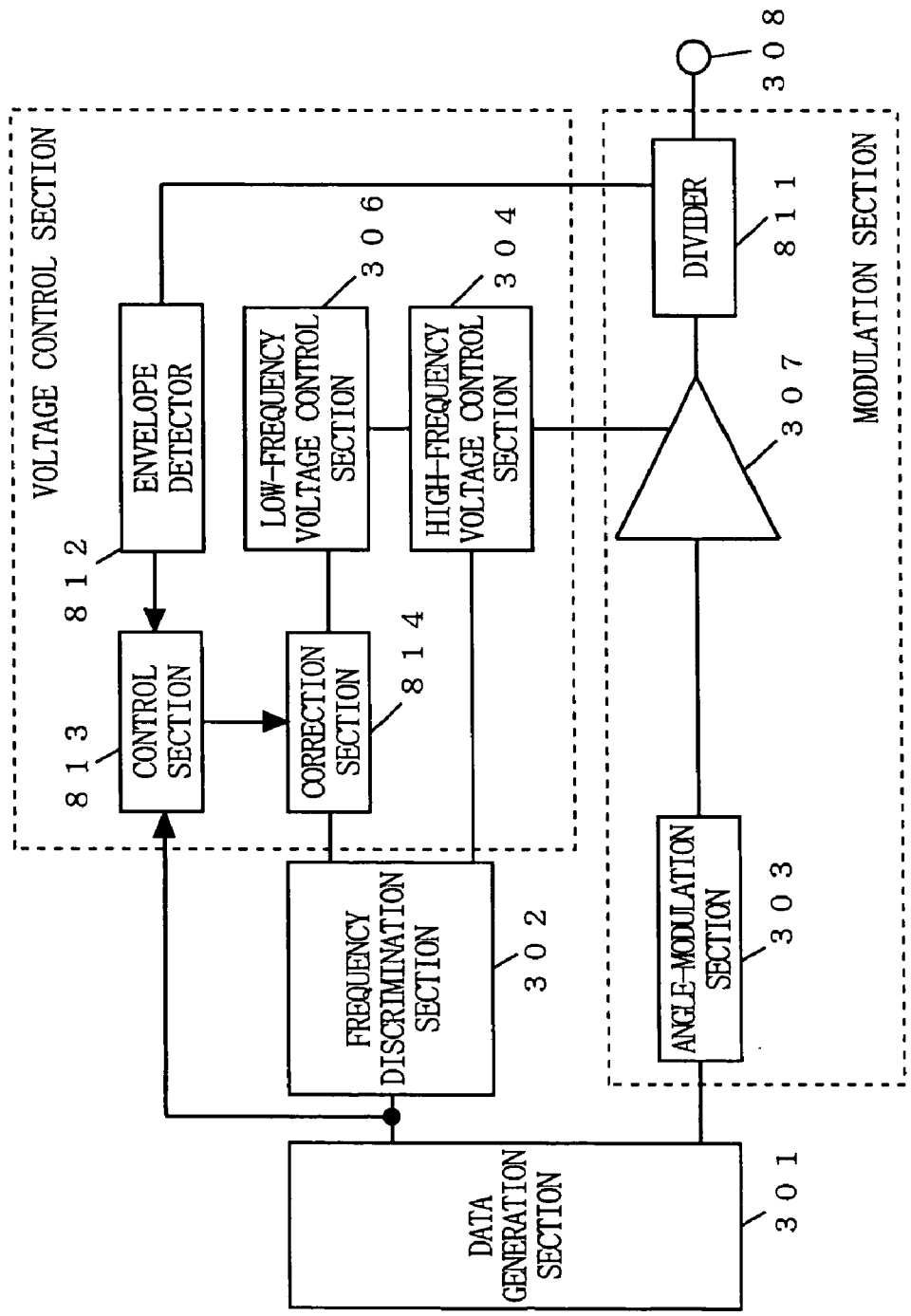
FIG. 10 is a block diagram showing an exemplary structure of the transmission circuit 20 of Embodiment 3 of FIG. 5 to which a correction control similar to that of Embodiment 4 is applied.

Note that the transmission circuit 20 of Embodiment 3 (FIG. 5) may also be adapted to perform a correction control similar to that described above. FIG. 10 is a block diagram showing an exemplary structure of the transmission circuit 20 of Embodiment 3 of FIG. 5 to which a correction control similar to that of Embodiment 4 is applied. Referring to FIG. 10, the transmission circuit 20 comprises a divider 811, an envelope detector 812, a control section 813, and a correction section 814 in addition to the components of the transmission circuit 20 of Embodiment 3.

Figure 13:
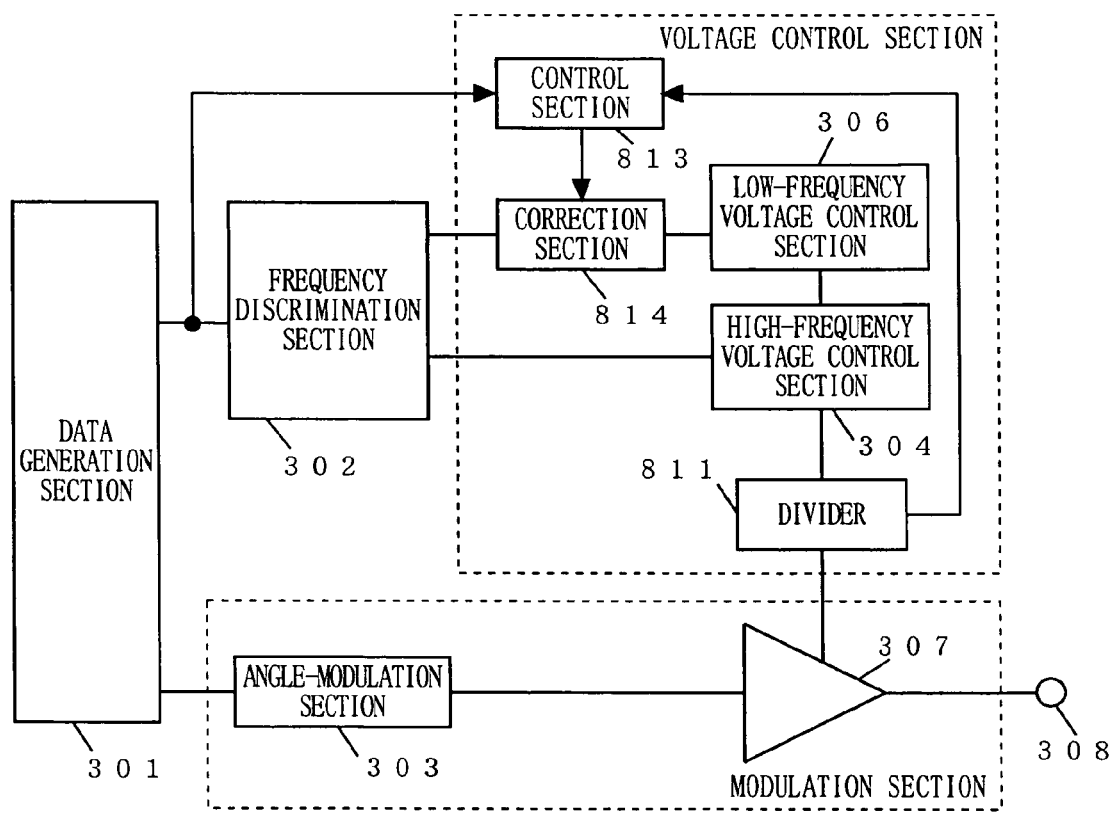
FIG. 13 is a block diagram showing an exemplary structure of the transmission circuit 20 of Embodiment 3 of FIG. 5, which is different from that of FIG. 10.

Note the transmission circuit 20 of Embodiment 3 (FIG. 5) may be adapted so that the divider 811 is provided between the high-frequency voltage control section 304 and the amplitude modulation section 307. FIG. 13 is a block diagram showing an exemplary structure of the transmission circuit 20 of Embodiment 3 of FIG. 5, which is different from that of FIG. 10. Whereas the transmission circuit 20 of FIG. 10 splits a signal containing an amplitude component and a phase component, the transmission circuit 20 of FIG. 13 splits a signal containing only an amplitude component. In the transmission circuit 20 of FIG. 13, the signal output from the divider 811 does not contain a phase component, and therefore, does not need to have the envelope detector 812, as is different from the transmission circuit 20 of FIG. 10. The transmission circuit 20 of FIG. 13 comprises the divider 811, a control section 813, and a correction section 814 in addition to the components of the transmission circuit 20 of Embodiment 3.

As described above, according to the transmission circuit 20 of Embodiment 4 of the present invention, it is possible to correct a shift in delay time and size between a low-frequency amplitude signal and a high-frequency amplitude signal of a modulated wave signal output from the transmission circuit 20 of any of Embodiments 1, 2 and 3. As a result, the transmission circuit 20 of Embodiment 4 can hold the linearity of the modulated wave signal.

Embodiment 5

Figure 11:
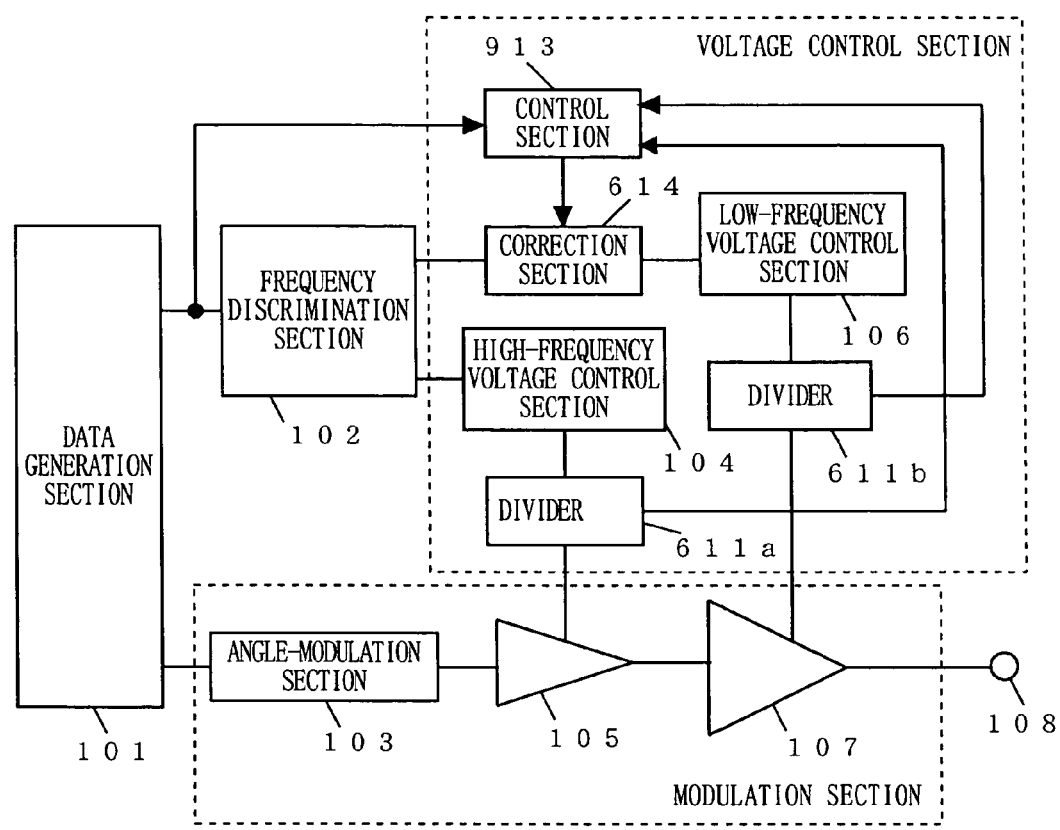
FIG. 11 is a block diagram showing an exemplary structure of a transmission circuit 20 according to Embodiment 5 of the present invention.

FIG. 11 is a block diagram showing an exemplary structure of a transmission circuit 20 according to Embodiment 5 of the present invention. The transmission circuit 20 of Embodiment 5 is different from that of Embodiment 1 in that a correction control is performed between a low-frequency amplitude signal and a high-frequency amplitude signal which are output from the frequency discrimination section 102. Therefore, the transmission circuit 20 of Embodiment 5 comprises a divider 611a, a divider 611b, a control section 913, and a correction section 614 in addition of the components of the transmission circuit 20 of Embodiment 1. Further, the transmission circuit 20 of Embodiment 5 is different from the transmission circuit 20 of Embodiment 4 of FIG. 8 in a position where an amplitude signal is divided by a divider.

Referring to FIG. 11, the transmission circuit 20 comprises the data generation section 101, the frequency discrimination section 102, the angle-modulation section 103, the high-frequency voltage control section 104, the low-frequency voltage control section 106, the amplitude modulation section 105, the amplitude modulation section 107, the output terminal 108, the divider 611a, the divider 611b, the control section 913, and the correction section 614.

Note that the high-frequency voltage control section 104, the low-frequency voltage control section 106, the divider 611a, the divider 611b, the control section 913, and the correction section 614 can be combined into one voltage control section. The angle-modulation section 103, the amplitude modulation section 105, and the amplitude modulation section 107 can be combined into one modulation section.

Referring to FIG. 11, the divider 611a and the divider 611b each divide an input into two or more. The control section 913 controls the correction section 614 so that a shift between a high-frequency amplitude signal and a low-frequency amplitude signal contained in outputs from the divider 611a and the divider 611b, respectively, is eliminated.

Note that the data generation section 101, the frequency discrimination section 102, the angle-modulation section 103, the high-frequency voltage control section 104, the low-frequency voltage control section 106, the amplitude modulation section 105, the amplitude modulation section 107, the output terminal 108, and the correction section 614 are similar to those of the transmission circuit 20 of Embodiment 4 of FIG. 8 and will not be explained.

Next, an operation of the transmission circuit 20 according to Embodiment 5 of the present invention will be described.

Referring to FIG. 11, an operation until the high-frequency voltage control section 104 and the low-frequency voltage control section 106 output voltages which have been controlled using the high-frequency amplitude signal and the low-frequency amplitude signal, respectively, is similar to that of Embodiment 1.

The divider 611a outputs a voltage output from the high-frequency voltage control section 104 to the control section 913 and the amplitude modulation section 105. The divider 611b outputs a voltage output from the low-frequency voltage control section 106 to the control section 913 and the amplitude modulation section 107. The control section 913 controls the correction section 614 using an amplitude signal generated by the data generation section 101 as a reference so that a shift between a high-frequency amplitude signal and a low-frequency amplitude signal contained in the voltages output from the divider 611a and the divider 611b, respectively, is eliminated. The correction section 614 delays a timing of outputting the low-frequency amplitude signal to the low-frequency voltage control section 106 in accordance with an instruction of the control section 613.

Although the correction section 614 is provided on the low-frequency voltage control section 106's side in the transmission circuit 20 of FIG. 11, the correction section 614 may be provided on the high-frequency voltage control section 104's side, or alternatively, may be provided on both the sides. In this case, the correction section 614 delays a timing of outputting the high-frequency amplitude signal or the low-frequency amplitude signal which are output from the frequency discrimination section 102, to the high-frequency voltage control section 104 or the low-frequency voltage control section 106, respectively, in accordance with an instruction from the control section 913.

Note the correction section 614 may adjust a gain of at least one of the low-frequency amplitude signal and the high-frequency amplitude signal which have been separated by the frequency discrimination section 102, in accordance with an instruction from the control section 913 so that a shift between the two signals is eliminated.

As described above, according to the transmission circuit 20 of Embodiment 5 of the present invention, it is possible to correct a shift in delay time and size between a low-frequency amplitude signal and a high-frequency amplitude signal of a modulated wave signal output from the transmission circuit 20 of any of Embodiments 1. As a result, the transmission circuit 20 of Embodiment 5 can hold the linearity of the modulated wave signal.

Embodiment 6

Figure 12:
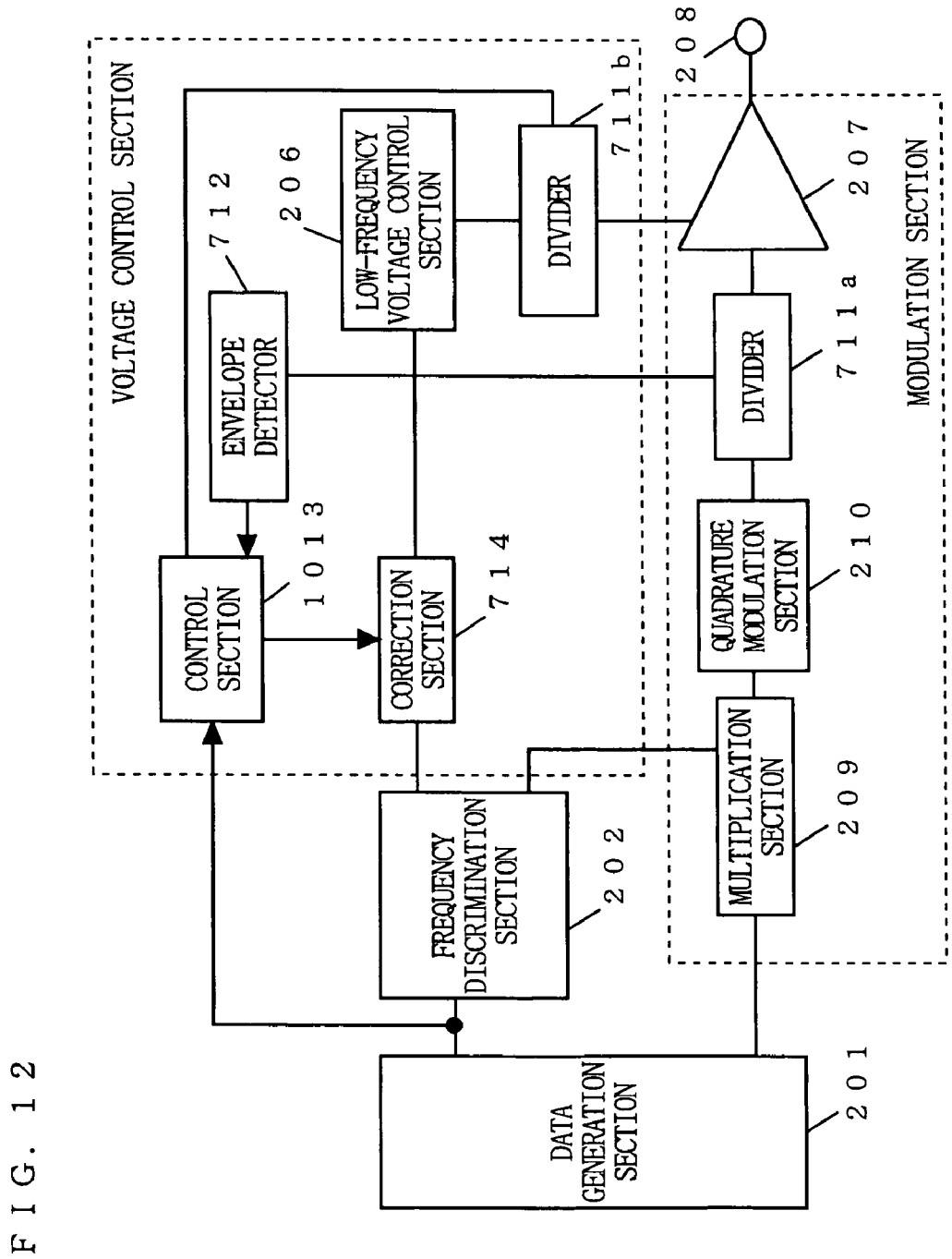
FIG. 12 is a block diagram showing an exemplary structure of a transmission circuit 20 according to Embodiment 6 of the present invention.

FIG. 12 is a block diagram showing an exemplary structure of a transmission circuit 20 according to Embodiment 6 of the present invention. The transmission circuit 20 of Embodiment 6 is different from that of Embodiment 2 in that a correction control is performed between a low-frequency amplitude signal and a high-frequency amplitude signal which are output from the frequency discrimination section 202. Therefore, the transmission circuit 20 of Embodiment 6 comprises a divider 711a, a divider 711b, an envelope detector 712, a control section 1013, and a correction section 714 in addition of the components of the transmission circuit 20 of Embodiment 2. Further, the transmission circuit 20 of Embodiment 6 is different from the transmission circuit 20 of Embodiment 4 of FIG. 9 in a position where an amplitude signal is divided by a divider.

Referring to FIG. 12, the transmission circuit 20 comprises the data generation section 201, the frequency discrimination section 202, the multiplication section 209, the quadrature modulation section 210, the amplitude modulation section 207, the low-frequency voltage control section 206, the output terminal 208, the divider 711a, the divider 711b, the envelope detector 712, the control section 1013, and the correction section 714.

The divider 711a and the divider 711b each divide an input into two or more. The control section 1013 controls the correction section 714 using an amplitude signal generated by the data generation section 201 as a reference so that a shift between a high-frequency amplitude signal and a low-frequency amplitude signal contained in outputs from the divider 711a and the divider 711b, respectively, is eliminated.

Note that the frequency discrimination section 202, the multiplication section 209, the quadrature modulation section 210, the amplitude modulation section 207, the low-frequency voltage control section 206, the output terminal 208, the envelope detector 712, and the correction section 714 are similar to those of the transmission circuit 20 of Embodiment 4 of FIG. 9 and will not be explained.

Note that the low-frequency voltage control section 206, the divider 711b, the envelope detector 712, the correction section 714, and the control section 1013 can be combined into one voltage control section. The multiplication section 209, the quadrature modulation section 210, the divider 711a, and the amplitude modulation section 207 can be combined into one modulation section.

Next, an operation of the transmission circuit 20 Embodiment 6 of the present invention will be described.

Referring to FIG. 12, an operation until the quadrature modulation section 210 and the low-frequency voltage control section 206 output voltages which have been controlled using a quadrature-modulated signal and a low-frequency amplitude signal, respectively, is similar to that of the transmission circuit 20 of Embodiment 2 of FIG. 3.

The divider 711a outputs a quadrature-modulated signal output from the quadrature modulation section 210 to the envelope detector 712 and the amplitude modulation section 207. The divider 711b outputs a voltage output from the low-frequency voltage control section 206 to the control section 1013 and the amplitude modulation section 207. The envelope detector 712 extracts only an amplitude modulated wave component (high-frequency amplitude signal) from the quadrature-modulated signal, and outputs the amplitude modulated wave component to the control section 1013. The control section 1013 controls the correction section 714 using an amplitude signal generated from the data generation section 201 as a reference so that a high-frequency amplitude signal output from the envelope detector 712 and a low-frequency amplitude signal contained in the voltage output from the divider 711b is eliminated. The correction section 714 delays a timing of outputting the low-frequency amplitude signal to the low-frequency voltage control section 206 in accordance with an instruction from the control section 1013.

Although the correction section 714 is provided on the low-frequency voltage control section 206's side in the transmission circuit 20 of FIG. 12, the correction section 714 may be provided on the multiplication section 209's side or may be provided on both the sides. In this case, the correction section 714 delays a timing of outputting the high-frequency amplitude signal or low-frequency amplitude signal output from the frequency discrimination section 202 to the multiplication section 209 or the low-frequency voltage control section 206, respectively, in accordance with an instruction of the control section 1013.

Note the correction section 714 may adjust a gain of at least one of the low-frequency amplitude signal and the high-frequency amplitude signal which have been separated by the frequency discrimination section 102, in accordance with an instruction from the control section 1013 so that a shift between the two signals is eliminated.

As described above, according to the transmission circuit 20 of Embodiment 6 of the present invention, it is possible to correct a shift in delay time and size between a low-frequency amplitude signal and a high-frequency amplitude signal of a modulated wave signal output from the transmission circuit 20 of any of Embodiments 2. As a result, the transmission circuit 20 of Embodiment 6 can hold the linearity of the modulated wave signal.

Embodiment 7

Figure 14:
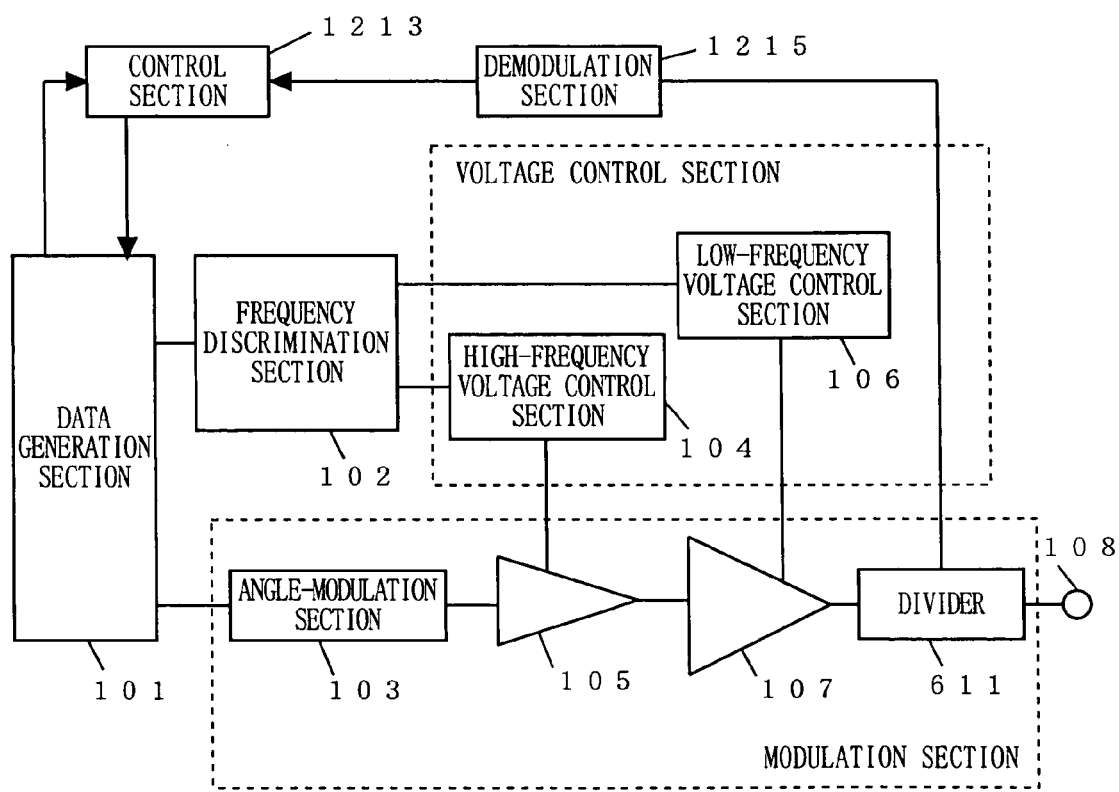
FIG. 14 is a block diagram showing an exemplary structure of a transmission circuit 20 according to Embodiment 7 of the present invention.

FIG. 14 is a block diagram showing an exemplary structure of a transmission circuit 20 according to Embodiment 7 of the present invention. The transmission circuit 20 of Embodiment 7 is different from that of Embodiment 1 in that a delay between an amplitude signal and a phase signal which are generated by the data generation section 101 is controlled. Therefore, the transmission circuit 20 of Embodiment 7 comprises a divider 611, a control section 1213, and a demodulation section 1215 in addition to the components of the transmission circuit 20 of Embodiment 1.

Referring to FIG. 14, the transmission circuit 20 comprises the data generation section 101, the frequency discrimination section 102, the angle-modulation section 103, the high-frequency voltage control section 104, the low-frequency voltage control section 106, the amplitude modulation section 105, the amplitude modulation section 107, the output terminal 108, the divider 611, the control section 1213, and the demodulation section 1215.

The divider 611 outputs a modulated wave signal output from the amplitude modulation section 107 to the demodulation section 1215 and the output terminal 108. The demodulation section 1215 demodulates the modulated wave signal input from the divider 611 to an amplitude signal and a phase signal. The control section 1213 controls the data generation section 101 so that a shift between the amplitude signal and the phase signal output from the demodulation section 1215 is eliminated.

Note that the data generation section 101, the frequency discrimination section 102, the angle-modulation section 103, the high-frequency voltage control section 104, the low-frequency voltage control section 106, the amplitude modulation section 105, the amplitude modulation section 107, and the output terminal 108 are similar to those of the transmission circuit 20 of Embodiment 1 of FIG. 2 and will not be explained.

Note that the high-frequency voltage control section 104 and the low-frequency voltage control section 106 can be combined into one voltage control section. The angle-modulation section 103, the amplitude modulation section 105, the amplitude modulation section 107, and the divider 611 can be combined into one modulation section.

Next, an operation of the transmission circuit 20 according to Embodiment 7 of the present invention will be described.

Referring to FIG. 14, an operation until the amplitude modulation section 107 outputs the modulated wave signal is similar to the transmission circuit 20 of Embodiment 1 of FIG. 2.

The divider 611 outputs the modulated wave signal output from the amplitude modulation section 107 to the demodulation section 1215 and the output terminal 108. Next, the demodulation section 1215 demodulates the modulated wave signal output from the divider 611, and outputs the post-modulation amplitude and phase signals to the control section 1213. The control section 1213 controls the data generation section 101 so that a shift between the post-modulation amplitude and phase signals output from the demodulation section 1215 is eliminated. The data generation section 101 adjusts a timing of outputting the amplitude signal and phase signal in accordance with an instruction from the control section 1213.

Figure 15:
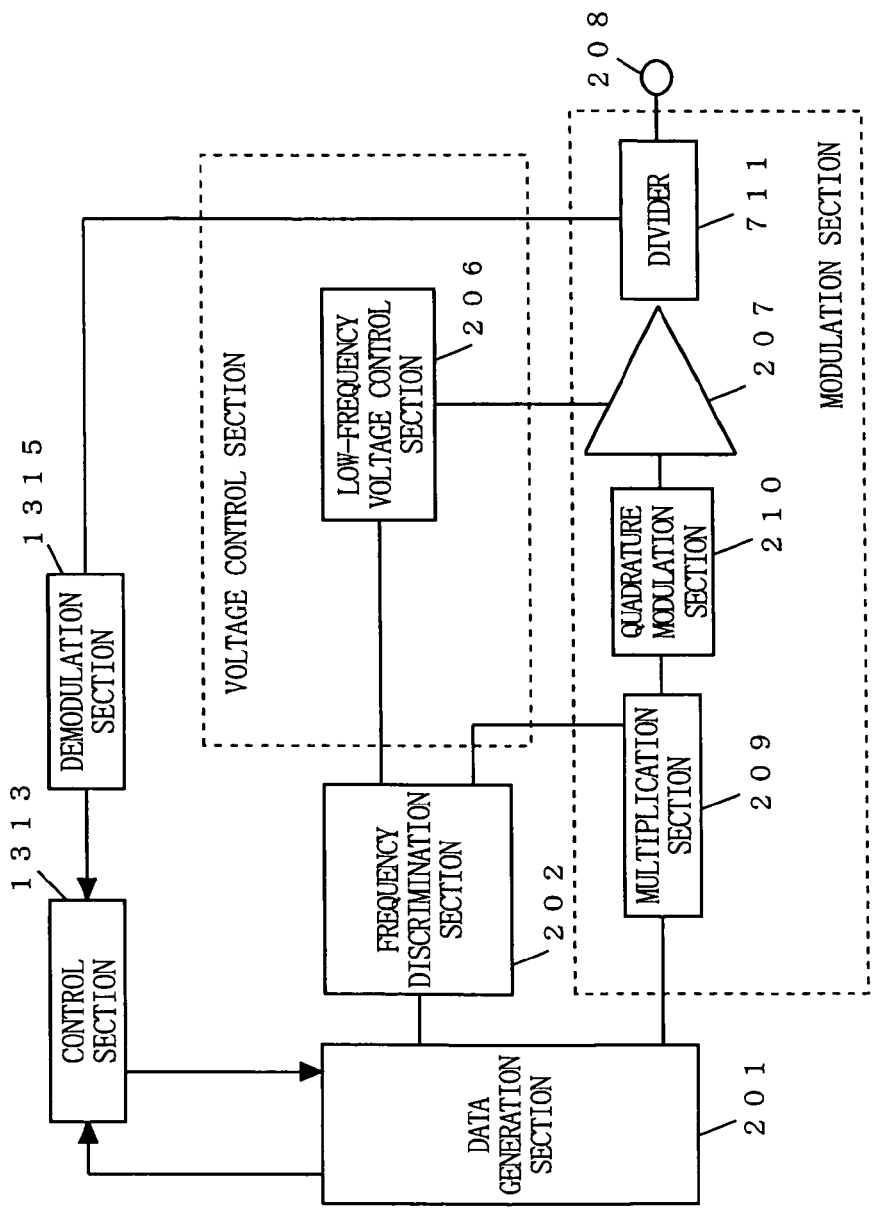
FIG. 15 is a block diagram showing an exemplary structure of the transmission circuit 20 of Embodiment 2 of FIG. 3 to which a delay control similar to that of Embodiment 7 is applied.

Note that the transmission circuit 20 of Embodiment 2 (FIG. 3) may be adapted to perform a delay control similar to that described above. FIG. 15 is a block diagram showing an exemplary structure of the transmission circuit 20 of Embodiment 2 of FIG. 3 to which a delay control similar to that of Embodiment 7 is applied. The transmission circuit 20 of FIG. 15 comprises a divider 711, a demodulation section 1315, and a control section 1313 in addition to the components of the transmission circuit 20 of Embodiment 2 of FIG. 3.

Figure 16:
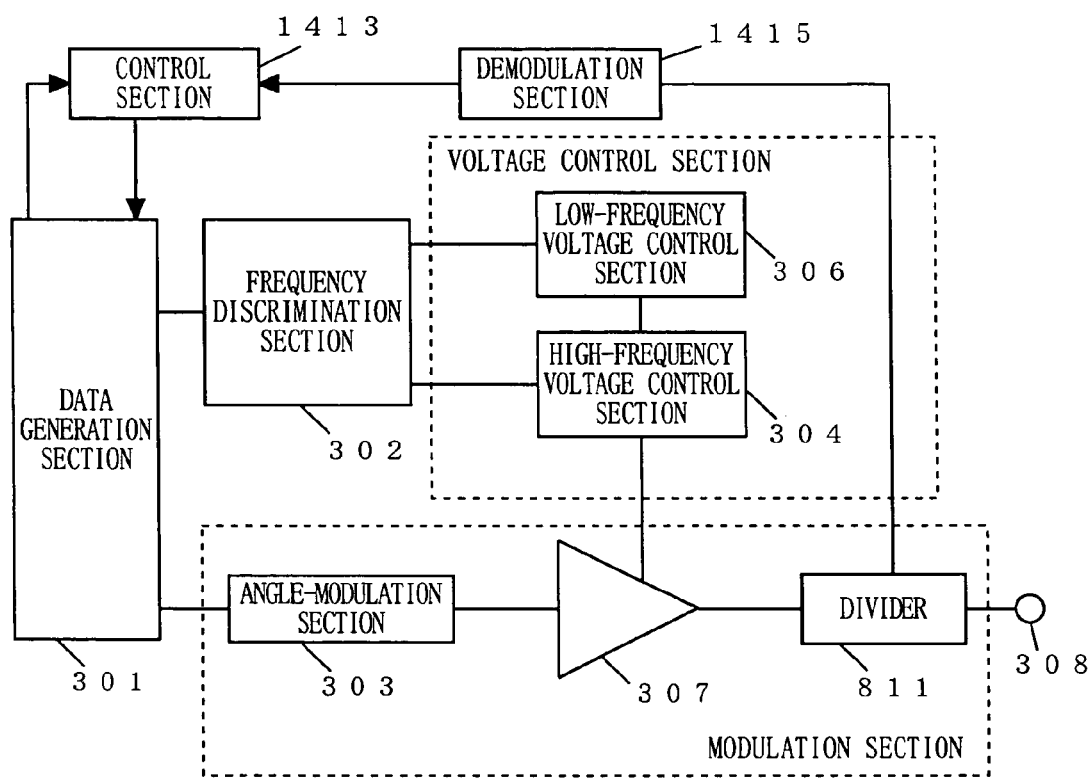
FIG. 16 is a block diagram showing an exemplary structure of the transmission circuit 20 of Embodiment 3 of FIG. 5 to which a delay control similar to that of Embodiment 7 is applied.

Note that the transmission circuit 20 of Embodiment 3 (FIG. 5) may be adapted to perform a delay control similar to that described above. FIG. 16 is a block diagram showing an exemplary structure of the transmission circuit 20 of Embodiment 3 of FIG. 5 to which a delay control similar to that of Embodiment 7 is applied. The transmission circuit 20 of FIG. 16 comprises a divider 811, a demodulation section 1415, and a control section 1413 in addition to the components of the transmission circuit 20 of Embodiment 3 of FIG. 5.

As described above, according to the transmission circuit 20 of Embodiment 7 of the present invention, it is possible to eliminate a shift between an amplitude signal and a phase signal contained in a modulated wave signal output from the transmission circuit 20 of Embodiment 1 and the transmission circuit 20 of Embodiment 3. Further, according to the transmission circuit 20 of FIG. 15, it is possible to eliminate a shift between an amplitude signal and a phase signal contained in a modulated wave signal output from the transmission circuit 20 of Embodiment 2. Therefore, the transmission circuit 20 of Embodiment 7 can hold the linearity of the modulated wave signal.

Embodiment 8

Figure 17:
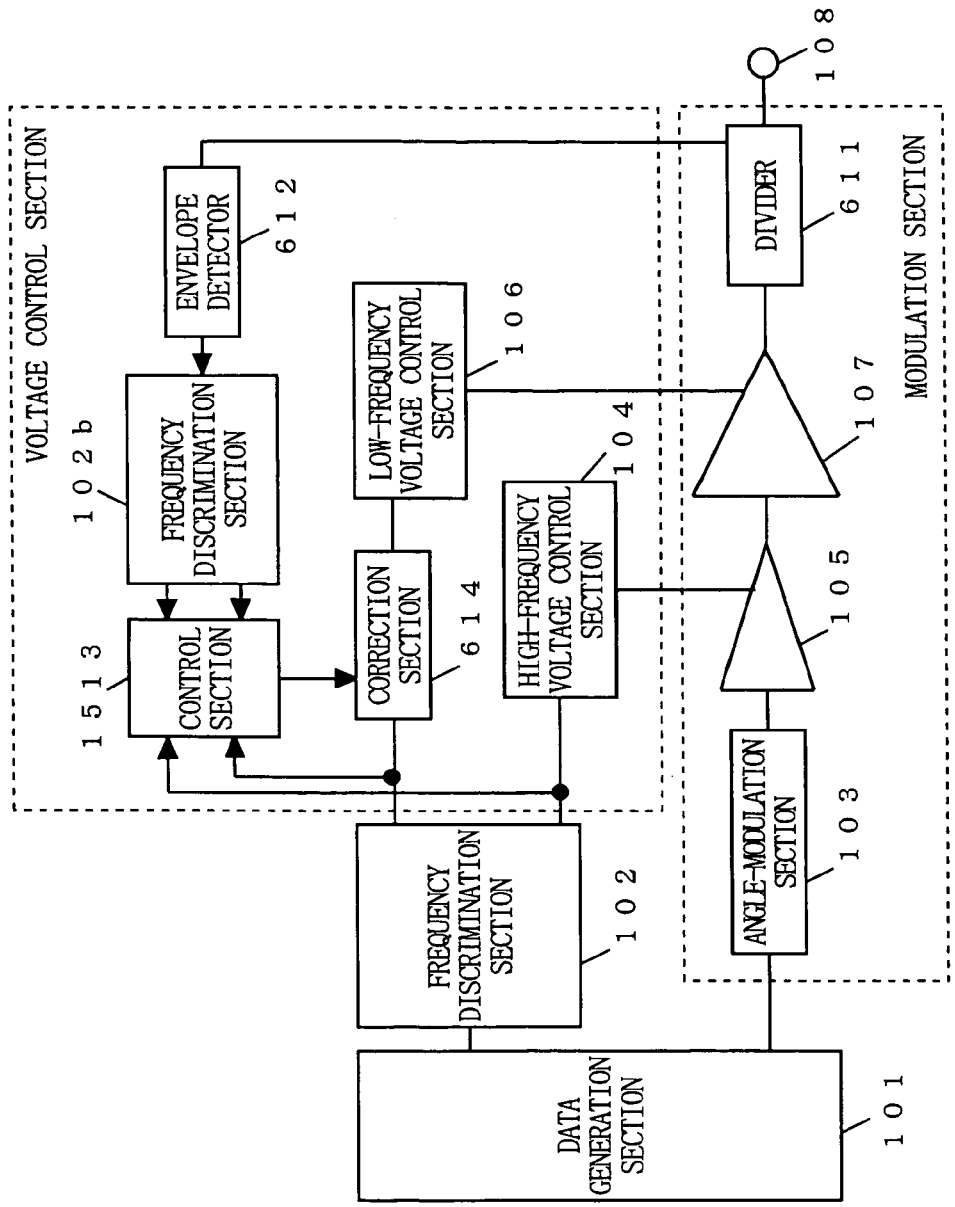
FIG. 17 is a block diagram showing an exemplary structure of a transmission circuit 20 according to Embodiment 8 of the present invention.

FIG. 17 is a block diagram showing an exemplary structure of a transmission circuit 20 according to Embodiment 8 of the present invention. The transmission circuit 20 of Embodiment 8 is different from that of Embodiment 1 in a correction control is performed between a low-frequency amplitude signal and a high-frequency amplitude signal output from the frequency discrimination section 102. The transmission circuit 20 of Embodiment 8 comprises a divider 611, an envelope detector 612, a frequency discrimination section 102$b$, a the control section 1513, and a correction section 614 in addition to the components of the transmission circuit 20 of Embodiment 1. Further, the transmission circuit 20 of Embodiment 8 is different from the transmission circuit 20 of Embodiment 4 of FIG. 8 in that the frequency discrimination section 102$b$ separates a post-modulation amplitude signal into a high-frequency amplitude signal and a low-frequency amplitude signal.

Referring to FIG. 17, the transmission circuit 20 comprises the data generation section 101, the frequency discrimination section 102, the angle-modulation section 103, the high-frequency voltage control section 104, the low-frequency voltage control section 106, the amplitude modulation section 105, the amplitude modulation section 107, the output terminal 108, the divider 611, the envelope detector 612, the frequency discrimination section 102$b$, the control section 1513, and the correction section 614.

The control section 1513 controls the correction section 614 so that a shift between the low-frequency amplitude signal and the high-frequency amplitude signal contained in the post-modulation amplitude signal is eliminated. The correction section 614 delays a timing of outputting the low-frequency amplitude signal in accordance with an instruction from the control section 613.

Note that the data generation section 101, the frequency discrimination section 102, the angle-modulation section 103, the high-frequency voltage control section 104, the low-frequency voltage control section 106, the amplitude modulation section 105, the amplitude modulation section 107, the output terminal 108, the divider 611, the envelope detector 612, and the correction section 614 are similar to those of the transmission circuit 20 of Embodiment 4 of FIG. 8 and will not be explained.

Note that the high-frequency voltage control section 104, the low-frequency voltage control section 106, the frequency discrimination section 102b, the envelope detector 612, the correction section 614, and the control section 1513 can be combined into one voltage control section. The angle-modulation section 103, the amplitude modulation section 105, the amplitude modulation section 107, and the divider 611 can be combined into one modulation section.

Next, an operation of the transmission circuit 20 according to Embodiment 8 of the present invention will be described.

Referring to FIG. 17, an operation until the amplitude modulation section 107 outputs a modulated wave signal is similar to that of Embodiment 1.

The amplitude modulation section 107 outputs a modulated wave signal to the divider 611. The divider 611 outputs the input modulated wave signal to the envelope detector 612 and the output terminal 108. The envelope detector 612 detects an envelope from the modulated wave signal to extract a post-modulation amplitude signal, which is in turn output to the frequency discrimination section 102b. The frequency discrimination section 102b separates a high-frequency amplitude signal and a low-frequency amplitude signal from the post-modulation amplitude signal, and output these signals to the control section 1513. The control section 1513 compares the high-frequency amplitude signal and the low-frequency amplitude signal output from the frequency discrimination section 102 with the post-modulation high-frequency and low-frequency amplitude signals output from the frequency discrimination section 102b to control the correction section 614 so that a shift between the post-modulation high-frequency and low-frequency amplitude signals. The correction section 614 delays a timing of outputting the low-frequency amplitude signal to the low-frequency voltage control section 106 in accordance with an instruction from the control section 1513.

Although the correction section 614 is provided on the low-frequency voltage control section 106's side in the transmission circuit 20 of FIG. 17, the correction section 614 may be provided on the high-frequency voltage control section 104's side, or alternatively, may be provided on both the sides. In this case, the correction section 614 delays a timing of outputting the high-frequency amplitude signal or the low-frequency amplitude signal which are output from the frequency discrimination section 102, to the high-frequency voltage control section 104 or the low-frequency voltage control section 106, respectively, in accordance with an instruction from the control section 1513.

Note the correction section 614 may adjust a gain of at least one of the low-frequency amplitude signal and the high-frequency amplitude signal which have been separated by the frequency discrimination section 102, in accordance with an instruction from the control section 1513 so that a shift between the two signals is eliminated.

Figure 18:
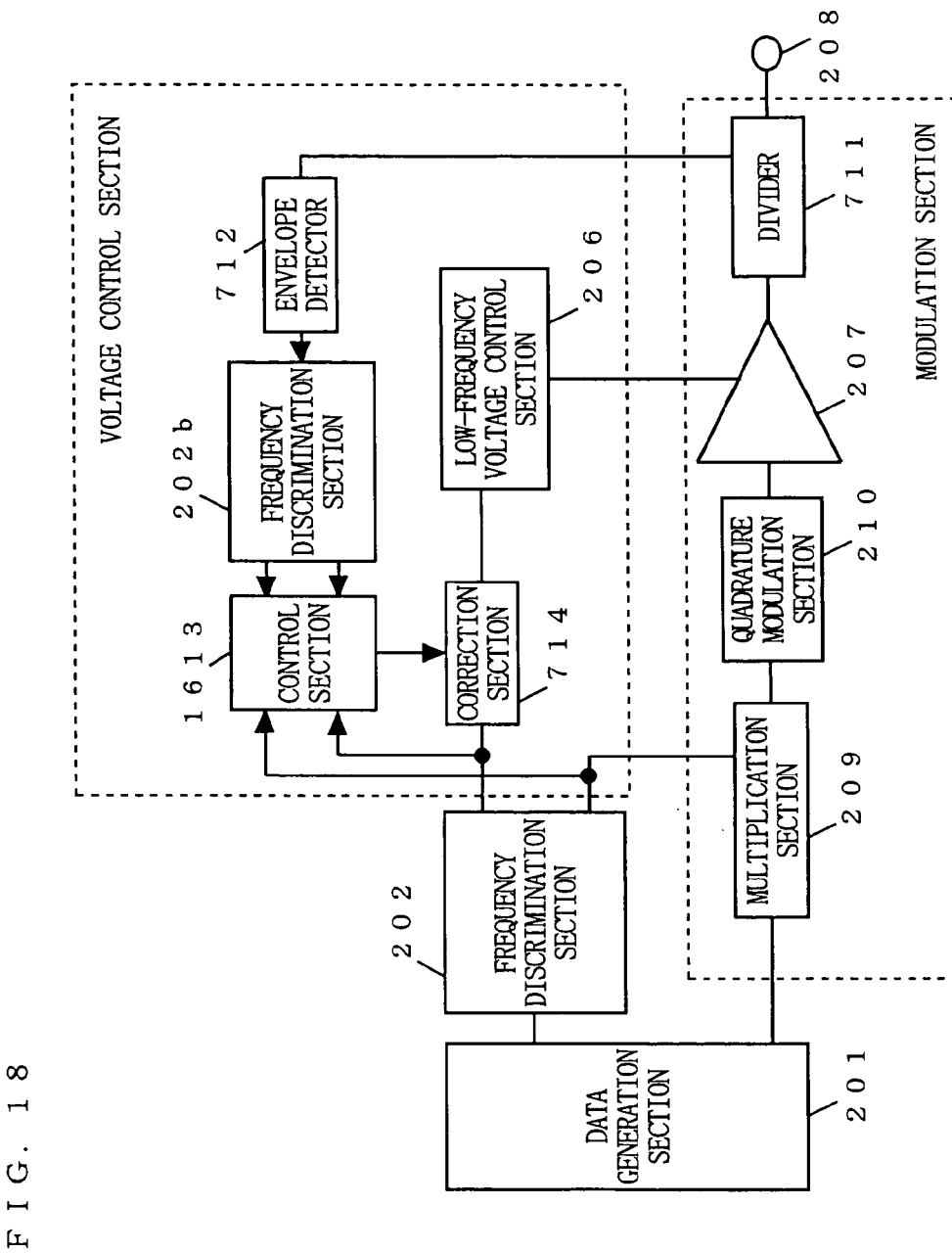
FIG. 18 is a block diagram showing an exemplary structure of the transmission circuit 20 of Embodiment 2 of FIG. 3 to which a correction control similar to that of Embodiment 8 is applied.

Note that the transmission circuit 20 of Embodiment 2 (FIG. 3) may be adapted to perform a correction control similar to that described above. FIG. 18 is a block diagram showing an exemplary structure of the transmission circuit 20 of Embodiment 2 of FIG. 3 to which a correction control similar to that of Embodiment 8 is applied. The transmission circuit 20 of FIG. 18 comprises a divider 711, an envelope detector 712, a frequency discrimination section 202b, a control section 1613, and a correction section 714 in addition to the components of the transmission circuit 20 of Embodiment 2.

Figure 19:
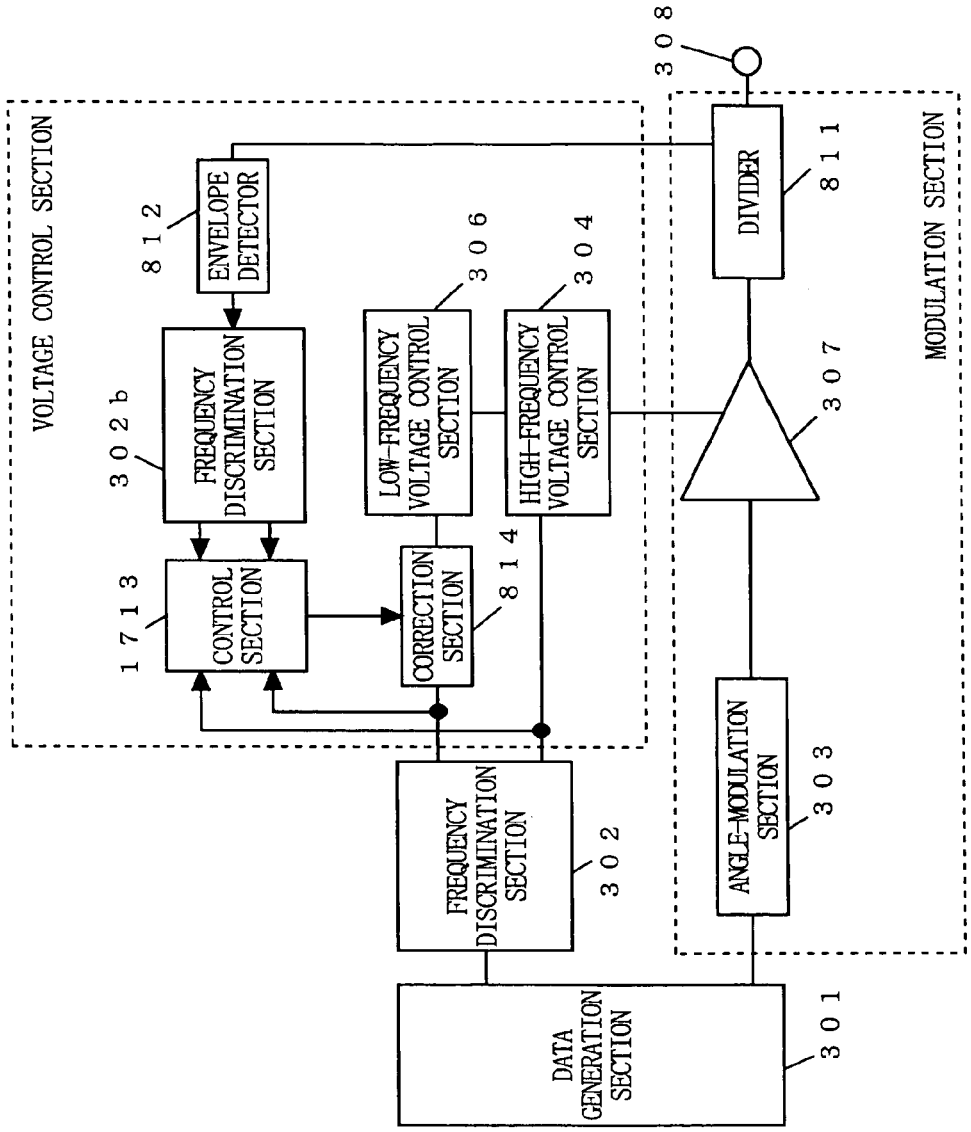
FIG. 19 is a block diagram showing an exemplary structure of the transmission circuit 20 of Embodiment 3 of FIG. 5 to which a correction control similar to that of Embodiment 8 is applied.

Note that the transmission circuit 20 of Embodiment 3 (FIG. 5) may be adapted to perform a correction control similar to that described above. FIG. 19 is a block diagram showing an exemplary structure of the transmission circuit 20 of Embodiment 3 of FIG. 5 to which a correction control similar to that of Embodiment 8 is applied. The transmission circuit 20 of FIG. 19 comprises a divider 811, an envelope detector 812, a frequency discrimination section 302b, a control section 1713, and a correction section 714 in addition to the components of the transmission circuit 20 of Embodiment 3.

As described above, according to the transmission circuit 20 of Embodiment 8 of the present invention, it is possible to correct a shift in delay time and size between a low-frequency amplitude signal and a high-frequency amplitude signal of a modulated wave signal output from the transmission circuit 20 of any of Embodiments 1, 2 and 3. As a result, the transmission circuit 20 of Embodiment 4 can hold the linearity of the modulated wave signal.

Note that the transmission circuit 20 of any of Embodiments 1 to 8 can be used in the communication apparatus 1 (FIG. 1), such as a mobile phone, a personal digital assist, a wireless LAN or the like. Thereby, the communication apparatus 1 can achieve low power consumption and broadband operation.

While the invention has been described in detail, the foregoing description is in all aspects illustrative and not restrictive. It is understood that numerous other modifications and variations can be devised without departing from the scope of the invention.

What is claimed is:

1. A transmission circuit for generating a modulated wave signal as a transmission signal, comprising:
    a data generation section for generating an amplitude signal containing an amplitude data component and a signal containing a phase data component based on data to be transmitted;
    a frequency discrimination section for separating the amplitude signal into a low-frequency amplitude signal and a high-frequency amplitude signal based on a predetermined frequency threshold;
    a voltage control section for outputting a voltage, an output level of the voltage having been controlled corresponding to at least one of the low-frequency amplitude signal and the high-frequency amplitude signal; and
    a modulation section for modulating the signal containing the phase data component and the voltage output from the voltage control section to generate the modulated wave signal.

2. The transmission circuit according to claim 1, wherein:
    the data generation section generates a phase signal as the signal containing the phase data component;
    the voltage control section comprises:
        a high-frequency voltage control section for controlling a voltage, an output voltage of the voltage having been controlled corresponding to the high-frequency amplitude signal; and a low-frequency voltage control section for outputting a voltage, an output level of the voltage having been controlled corresponding to the low-frequency amplitude signal;

the modulation section comprises:
an angle modulation section for angle-modulating the phase signal to output an angle-modulated wave signal;
a high-frequency amplitude modulation section for amplitude-modulating the angle-modulated wave signal using the voltage output from the high-frequency voltage control section to output a modulated wave signal; and
an amplitude modulation section for amplitude-modulating the modulated wave signal output from the high-frequency amplitude modulation section using the voltage output from the low-frequency voltage control section to generate the modulated wave signal to be transmitted.

3. The transmission circuit according to claim 2, wherein the modulation section further comprises a divider for dividing the modulated wave signal output from the amplitude modulation section,
the transmission circuit further comprises:
a demodulation section for demodulating the modulated wave signal divided by the divider to output a post-modulation amplitude signal and a post-modulation phase signal; and
a control section for measuring a shift between the post-modulation amplitude signal and the post-modulation phase signal output by the demodulation section to control the data generation section so that a shift between the amplitude signal and the phase signal output from the data generation section is eliminated.

4. The transmission circuit according to claim 2, wherein:
the modulation section further comprises a divider for dividing the modulated wave signal output from the amplitude modulation section;
the voltage control section further comprises:
an envelope detector for detecting an envelope from the modulated wave signal divided by the divider to output a post-modulation amplitude signal;
a control section for comparing the amplitude signal generated by the data generation section with the post-modulation amplitude signal output from the envelope detector to measure a shift in at least one of delay time and size between a low-frequency amplitude signal and a high-frequency amplitude signal contained in the post-modulation amplitude signal, and outputting an instruction to eliminate the measured shift; and
a correction section for correcting at least one of an output timing and a size of the low-frequency amplitude signal and the high-frequency amplitude signal separated by the frequency discrimination section, in accordance with the instruction of the control section.

5. The transmission circuit according to claim 4, wherein the correction section eliminates the delay time shift by delaying a timing of outputting at least one of the low-frequency amplitude signal and high-frequency amplitude signal separated by the frequency discrimination section in accordance with the instruction from the control section.

6. The transmission circuit according to claim 4, wherein the correction section eliminates the size shift by adjusting a gain of at least one of the low-frequency amplitude signal and the high-frequency amplitude signal separated by the frequency discrimination section in accordance with the instruction of the control section.

7. The transmission circuit according to claim 2, wherein when an output level of a signal output from the amplitude modulation section is lower than the threshold defining the predetermined signal intensity, the frequency discrimination section reduces the predetermined frequency threshold in a stepwise manner, corresponding to the output level of the signal.

8. The transmission circuit according to claim 2, wherein the low-frequency voltage control section is a switching regulator.

9. The transmission circuit according to claim 8, wherein the low-frequency voltage control section comprises:
a pulse conversion section for converting the low-frequency amplitude signal to a pulse to output a pulse signal;
an amplifier for amplifying the pulse signal to output a voltage, an output level of the voltage having been controlled corresponding to the pulse signal; and
a lowpass filter for outputting a voltage obtained by removing a spurious signal from the voltage output from the amplifier, the spurious signal being a noise signal occurring in the pulse conversion section.

10. The transmission circuit according to claim 2, wherein the high-frequency voltage control section is a series regulator.

11. The transmission circuit according to claim 2, wherein the voltage control section further comprises:
a first divider for dividing the voltage controlled using the high-frequency amplitude signal output from the high-frequency voltage control section;
a second divider for dividing the voltage controlled using the low-frequency amplitude signal output from the low-frequency voltage control section;
a control section for measuring a shift in at least one of delay time and size between a low-frequency amplitude signal and a high-frequency amplitude signal contained in the voltages divided by the first divider and the second divider, respectively, using the amplitude signal generated by the data generation section as a reference, and outputting an instruction to eliminate the measured shift; and
a correction section for correcting at least one of an output timing and a size of the low-frequency amplitude signal and the high-frequency amplitude signal separated by the frequency discrimination section, in accordance with the instruction of the control section.

12. The transmission circuit according to claim 11, wherein the correction section eliminates the size shift by adjusting a gain of at least one of the low-frequency amplitude signal and the high-frequency amplitude signal separated by the frequency discrimination section in accordance with the instruction of the control section.

13. The transmission circuit according to claim 11, wherein the correction section eliminates the delay time shift by delaying a timing of outputting at least one of the low-frequency amplitude signal and high-frequency amplitude signal separated by the frequency discrimination section in accordance with the instruction from the control section.

14. The transmission circuit according to claim 2, wherein:
the modulation section further comprises a divider for dividing the modulated wave signal output from the amplitude modulation section;

the voltage control section further comprises:
an envelope detector for detecting an envelope from the modulated wave signal divided by the divider to output a post-modulation amplitude signal;
the modulation frequency discrimination section for separating the post-modulation amplitude signal into a post-modulation low-frequency amplitude signal and a post-modulation high-frequency amplitude signal based on a predetermined frequency threshold;
a control section for measuring a shift in at least one of delay time and size between the post-modulation high-frequency amplitude signal and the post-modulation low-frequency amplitude signal separated by the modulation frequency discrimination section using the high-frequency amplitude signal and the low-frequency amplitude signal separated by the frequency discrimination section as a reference to output an instruction to eliminate the measured shift; and
a correction section for correcting at least one of an output timing and a size of the low-frequency amplitude signal and the high-frequency amplitude signal separated by the frequency discrimination section, in accordance with the instruction of the control section.

15. The transmission circuit according to claim 14, wherein the correction section eliminates the delay time shift by delaying a timing of outputting at least one of the low-frequency amplitude signal and high-frequency amplitude signal separated by the frequency discrimination section in accordance with the instruction from the control section.

16. The transmission circuit according to claim 14, wherein the correction section eliminates the size shift by adjusting a gain of at least one of the low-frequency amplitude signal and the high-frequency amplitude signal separated by the frequency discrimination section in accordance with the instruction of the control section.

17. The transmission circuit according to claim 1, wherein:
the data generation section for generating a quadrature signal obtained by representing a phase signal in an orthogonal coordinate system as the signal containing the phase data component;
the voltage control section comprises:
a low-frequency voltage control section for outputting a voltage, an output level of the voltage having been controlled corresponding to the low-frequency amplitude signal;
the modulation section comprises:
a multiplication section for multiplying the quadrature signal with the high-frequency amplitude signal;
a quadrature modulation section for quadrature-modulating a signal obtained by multiplication of the multiplication section to output a quadrature-modulated signal;
an amplitude modulation section for amplitude-modulating the quadrature-modulated signal using the voltage output from the low-frequency voltage control section to output the modulated wave signal.

18. The transmission circuit according to claim 17, wherein:
the modulation section further comprises a first divider for dividing the quadrature-modulated signal output from the quadrature modulation section;
the voltage control section further comprises:
a second divider for dividing the voltage controlled using the low-frequency amplitude signal output from the low-frequency voltage control section;
an envelope detector for detecting an envelope from the quadrature-modulated signal divided by the first divider to output a post-modulation amplitude signal;
a control section for measuring a shift in at least one of delay time and size between a high-frequency amplitude signal contained in the post-modulation amplitude signal output by the envelope detector and a low-frequency amplitude signal contained in the voltage divided by the second divider using the amplitude signal generated by the data generation section as a reference to output an instruction to eliminate the measured shift; and
a correction section for correcting at least one of an output timing and a size of the low-frequency amplitude signal and the high-frequency amplitude signal separated by the frequency discrimination section, in accordance with the instruction of the control section.

19. The transmission circuit according to claim 18, wherein the correction section eliminates the delay time shift by delaying a timing of outputting at least one of the low-frequency amplitude signal and high-frequency amplitude signal separated by the frequency discrimination section in accordance with the instruction from the control section.

20. The transmission circuit according to claim 18, wherein the correction section eliminates the size shift by adjusting a gain of at least one of the low-frequency amplitude signal and the high-frequency amplitude signal separated by the frequency discrimination section in accordance with the instruction of the control section.

21. The transmission circuit according to claim 17, wherein the modulation section further comprising a divider for dividing the modulated wave signal output from the amplitude modulation section,
the transmission circuit further comprises:
a demodulation section for demodulating the modulated wave signal divided by the divider to output a post-modulation amplitude signal and a post-modulation quadrature signal; and
a control section for measuring a shift between the post-modulation amplitude signal and the post-modulation quadrature signal output by the demodulation section to control the data generation section so that a shift between the amplitude signal and the quadrature signal output from the data generation section is eliminated.

22. The transmission circuit according to claim 17, wherein the low-frequency voltage control section is a switching regulator.

23. The transmission circuit according to claim 22, wherein the low-frequency voltage control section comprises:
a pulse conversion section for converting the low-frequency amplitude signal to a pulse to output a pulse signal;
an amplifier for amplifying the pulse signal to output a voltage, an output level of the voltage having been controlled corresponding to the pulse signal; and
a lowpass filter for outputting a voltage obtained by removing a spurious signal from the voltage output from the amplifier, the spurious signal being a noise signal occurring in the pulse conversion section.

24. The transmission circuit according to claim 17, wherein when an output level of a signal output from the amplitude modulation section is lower than the threshold defining the predetermined signal intensity, the frequency discrimination section reduces the predetermined frequency threshold in a stepwise manner, corresponding to the output level of the signal.

25. The transmission circuit according to claim 17, wherein:
the modulation section further comprises a divider for dividing the modulated wave signal output from the amplitude modulation section;
the voltage control section further comprises:
an envelope detector for detecting an envelope from the modulated wave signal divided by the divider to output a post-modulation amplitude signal;
a control section for comparing the amplitude signal generated by the data generation section with the post-modulation amplitude signal output from the envelope detector to measure a shift in at least one of delay time and size between a low-frequency amplitude signal and a high-frequency amplitude signal contained in the post-modulation amplitude signal, and outputting an instruction to eliminate the measured shift; and
a correction section for correcting at least one of an output timing and a size of the low-frequency amplitude signal and the high-frequency amplitude signal separated by the frequency discrimination section, in accordance with the instruction of the control section.

26. The transmission circuit according to claim 25, wherein the correction section eliminates the delay time shift by delaying a timing of outputting at least one of the low-frequency amplitude signal and high-frequency amplitude signal separated by the frequency discrimination section in accordance with the instruction from the control section.

27. The transmission circuit according to claim 25, wherein the correction section eliminates the size shift by adjusting a gain of at least one of the low-frequency amplitude signal and the high-frequency amplitude signal separated by the frequency discrimination section in accordance with the instruction of the control section.

28. The transmission circuit according to claim 17, wherein:
the modulation section further comprises a divider for dividing the modulated wave signal output from the amplitude modulation section;
the voltage control section further comprises:
an envelope detector for detecting an envelope from the modulated wave signal divided by the divider to output a post-modulation amplitude signal;
the modulation frequency discrimination section for separating the post-modulation amplitude signal into a post-modulation low-frequency amplitude signal and a post-modulation high-frequency amplitude signal based on a predetermined frequency threshold;
a control section for measuring a shift in at least one of delay time and size between the post-modulation high-frequency amplitude signal and the post-modulation low-frequency amplitude signal separated by the modulation frequency discrimination section using the high-frequency amplitude signal and the low-frequency amplitude signal separated by the frequency discrimination section as a reference to output an instruction to eliminate the measured shift; and
a correction section for correcting at least one of an output timing and a size of the low-frequency amplitude signal and the high-frequency amplitude signal separated by the frequency discrimination section, in accordance with the instruction of the control section.

29. The transmission circuit according to claim 28, wherein the correction section eliminates the delay time shift by delaying a timing of outputting at least one of the low-frequency amplitude signal and high-frequency amplitude signal separated by the frequency discrimination section in accordance with the instruction from the control section.

30. The transmission circuit according to claim 28, wherein the correction section eliminates the size shift by adjusting a gain of at least one of the low-frequency amplitude signal and the high-frequency amplitude signal separated by the frequency discrimination section in accordance with the instruction of the control section.

31. The transmission circuit according to claim 1, wherein:
the data generation section generates a phase signal as the signal containing the phase data component;
the voltage control section comprises:
a low-frequency voltage control section for outputting a voltage, an output level of the voltage having been controlled corresponding to the low-frequency amplitude signal; and
a high-frequency voltage control section for outputting a voltage, an output level of the voltage having been controlled corresponding to the high-frequency amplitude signal and the voltage output from the low-frequency voltage control section;
the modulation section comprises:
an angle modulation section for angle-modulating the phase signal to output an angle-modulated wave signal; and
an amplitude modulation section for amplitude-modulating the angle-modulated wave signal using the voltage output from the high-frequency voltage control section to generate the modulated wave signal.

32. The transmission circuit according to claim 31, wherein the voltage control section further comprises:
a divider for dividing the voltage controlled using the amplitude signal output from the high-frequency voltage control section;
a control section for comparing the amplitude signal generated by the data generation section with a post-modulation amplitude signal contained in the voltage divided by the divider to measure a shift in at least one of delay time and size between a low-frequency amplitude signal and a high-frequency amplitude signal contained in the post-modulation amplitude signal, and outputting an instruction to eliminate the measured shift; and
a correction section for correcting at least one of an output timing and a size of the low-frequency amplitude signal and the high-frequency amplitude signal separated by the frequency discrimination section, in accordance with the instruction of the control section.

33. The transmission circuit according to claim 32, wherein the correction section eliminates the delay time shift by delaying a timing of outputting at least one of the low-frequency amplitude signal and high-frequency amplitude signal separated by the frequency discrimination section in accordance with the instruction from the control section.

34. The transmission circuit according to claim 32, wherein the correction section eliminates the size shift by adjusting a gain of at least one of the low-frequency amplitude signal and the high-frequency amplitude signal separated by the frequency discrimination section in accordance with the instruction of the control section.

35. The transmission circuit according to claim 31, wherein the high-frequency voltage control section is a series regulator.

36. The transmission circuit according to claim 31, wherein the low-frequency voltage control section is a switching regulator.

37. The transmission circuit according to claim 36, wherein the low-frequency voltage control section comprises:
- a pulse conversion section for converting the low-frequency amplitude signal to a pulse to output a pulse signal;
- an amplifier for amplifying the pulse signal to output a voltage, an output level of the voltage having been controlled corresponding to the pulse signal; and
- a lowpass filter for outputting a voltage obtained by removing a spurious signal from the voltage output from the amplifier, the spurious signal being a noise signal occurring in the pulse conversion section.

38. The transmission circuit according to claim 31, wherein when an output level of a signal output from the amplitude modulation section is lower than the threshold defining the predetermined signal intensity, the frequency discrimination section reduces the predetermined frequency threshold in a stepwise manner, corresponding to the output level of the signal.

39. The transmission circuit according to claim 31, wherein:
- the modulation section further comprises a divider for dividing the modulated wave signal output from the amplitude modulation section;
- the voltage control section further comprises:
  - an envelope detector for detecting an envelope from the modulated wave signal divided by the divider to output a post-modulation amplitude signal;
  - a control section for comparing the amplitude signal generated by the data generation section with the post-modulation amplitude signal output from the envelope detector to measure a shift in at least one of delay time and size between a low-frequency amplitude signal and a high-frequency amplitude signal contained in the post-modulation amplitude signal, and outputting an instruction to eliminate the measured shift; and
  - a correction section for correcting at least one of an output timing and a size of the low-frequency amplitude signal and the high-frequency amplitude signal separated by the frequency discrimination section, in accordance with the instruction of the control section.

40. The transmission circuit according to claim 39, wherein the correction section eliminates the delay time shift by delaying a timing of outputting at least one of the low-frequency amplitude signal and high-frequency amplitude signal separated by the frequency discrimination section in accordance with the instruction from the control section.

41. The transmission circuit according to claim 39, wherein the correction section eliminates the size shift by adjusting a gain of at least one of the low-frequency amplitude signal and the high-frequency amplitude signal separated by the frequency discrimination section in accordance with the instruction of the control section.

42. The transmission circuit according to claim 31, wherein:
- the modulation section further comprises a divider for dividing the modulated wave signal output from the amplitude modulation section;
- the voltage control section further comprises:
  - an envelope detector for detecting an envelope from the modulated wave signal divided by the divider to output a post-modulation amplitude signal;
  - the modulation frequency discrimination section for separating the post-modulation amplitude signal into a post-modulation low-frequency amplitude signal and a post-modulation high-frequency amplitude signal based on a predetermined frequency threshold;
  - a control section for measuring a shift in at least one of delay time and size between the post-modulation high-frequency amplitude signal and the post-modulation low-frequency amplitude signal separated by the modulation frequency discrimination section using the high-frequency amplitude signal and the low-frequency amplitude signal separated by the frequency discrimination section as a reference to output an instruction to eliminate the measured shift; and
  - a correction section for correcting at least one of an output timing and a size of the low-frequency amplitude signal and the high-frequency amplitude signal separated by the frequency discrimination section, in accordance with the instruction of the control section.

43. The transmission circuit according to claim 42, wherein the correction section eliminates the delay time shift by delaying a timing of outputting at least one of the low-frequency amplitude signal and high-frequency amplitude signal separated by the frequency discrimination section in accordance with the instruction from the control section.

44. The transmission circuit according to claim 42, wherein the correction section eliminates the size shift by adjusting a gain of at least one of the low-frequency amplitude signal and the high-frequency amplitude signal separated by the frequency discrimination section in accordance with the instruction of the control section.

45. The transmission circuit according to claim 31, wherein the modulation section further comprises a divider for dividing the modulated wave signal output from the amplitude modulation section,
- the transmission circuit further comprises:
  - a demodulation section for demodulating the modulated wave signal divided by the divider to output a post-modulation amplitude signal and a post-modulation phase signal; and
  - a control section for measuring a shift between the post-modulation amplitude signal and the post-modulation phase signal output by the demodulation section to control the data generation section so that a shift between the amplitude signal and the phase signal output from the data generation section is eliminated.

46. The transmission circuit according to claim 1, wherein the frequency discrimination section extracts a component having a frequency lower than a predetermined frequency from the amplitude signal to output the low-frequency amplitude signal, and divides the amplitude signal by the low-frequency amplitude signal to output the high-frequency amplitude signal.

47. The transmission circuit according to claim 1, wherein the frequency discrimination section comprises:
   a lowpass filter for extracting a component having a frequency lower than a predetermined frequency from the amplitude signal to output the low-frequency amplitude signal; and
   a division section for dividing the amplitude signal by the low-frequency amplitude signal to output the high-frequency amplitude signal.

48. A communication apparatus for outputting a radio signal, comprising:
   the transmission circuit according to claim 1; and
   an antenna section for outputting a modulated wave signal generated by the transmission circuit as the radio signal.

* * * * *